Patented Oct. 16, 1951

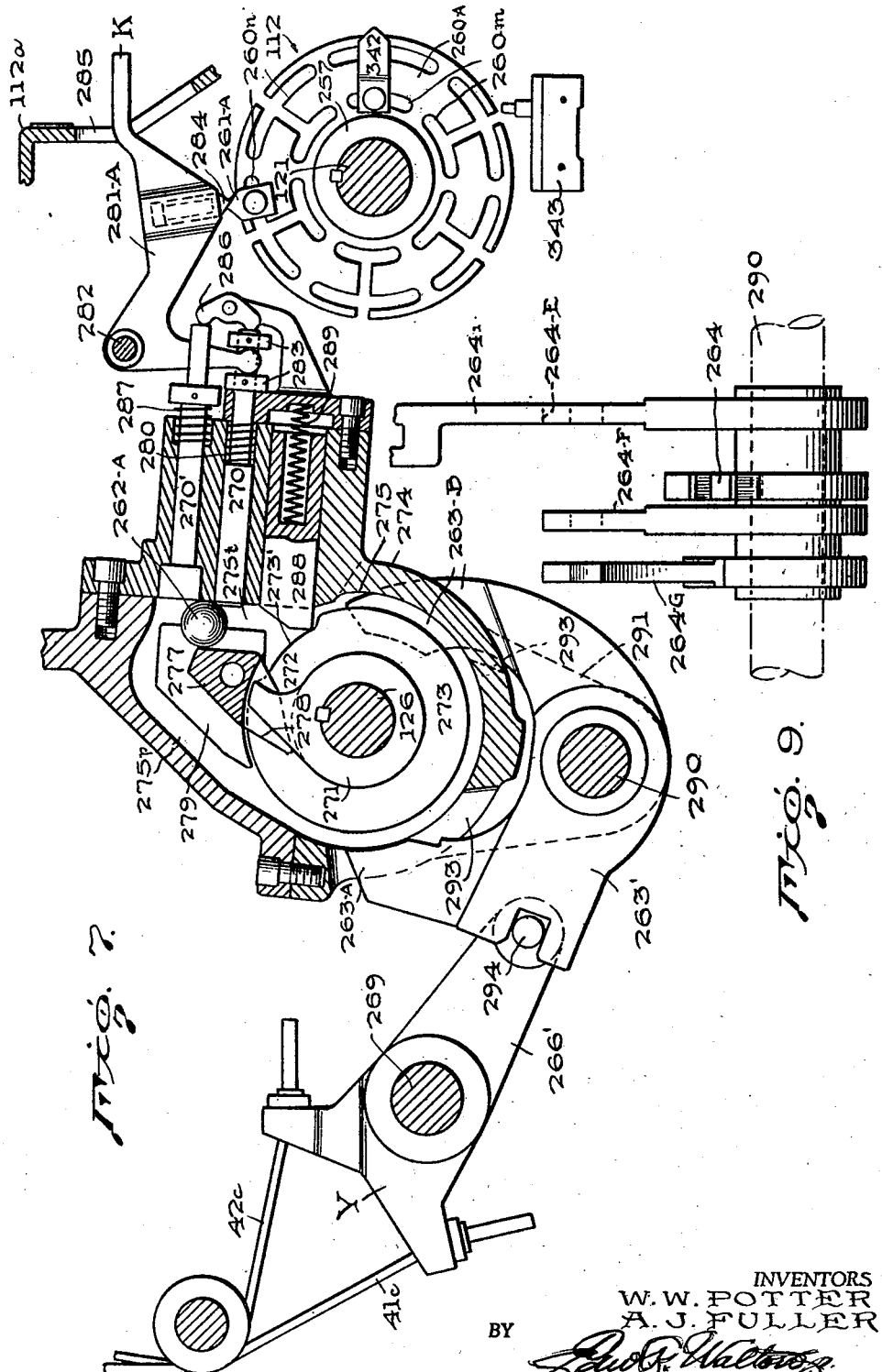

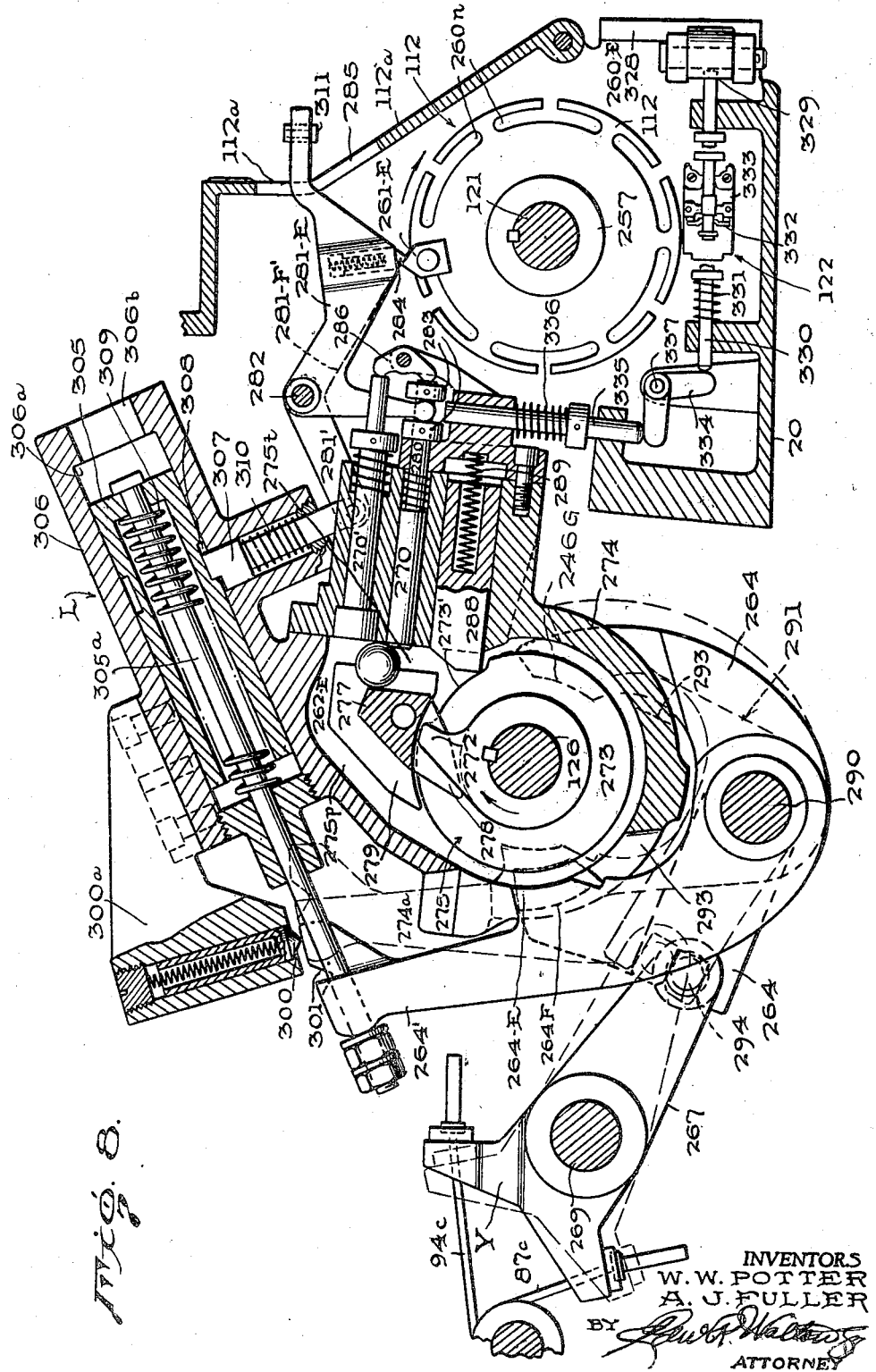

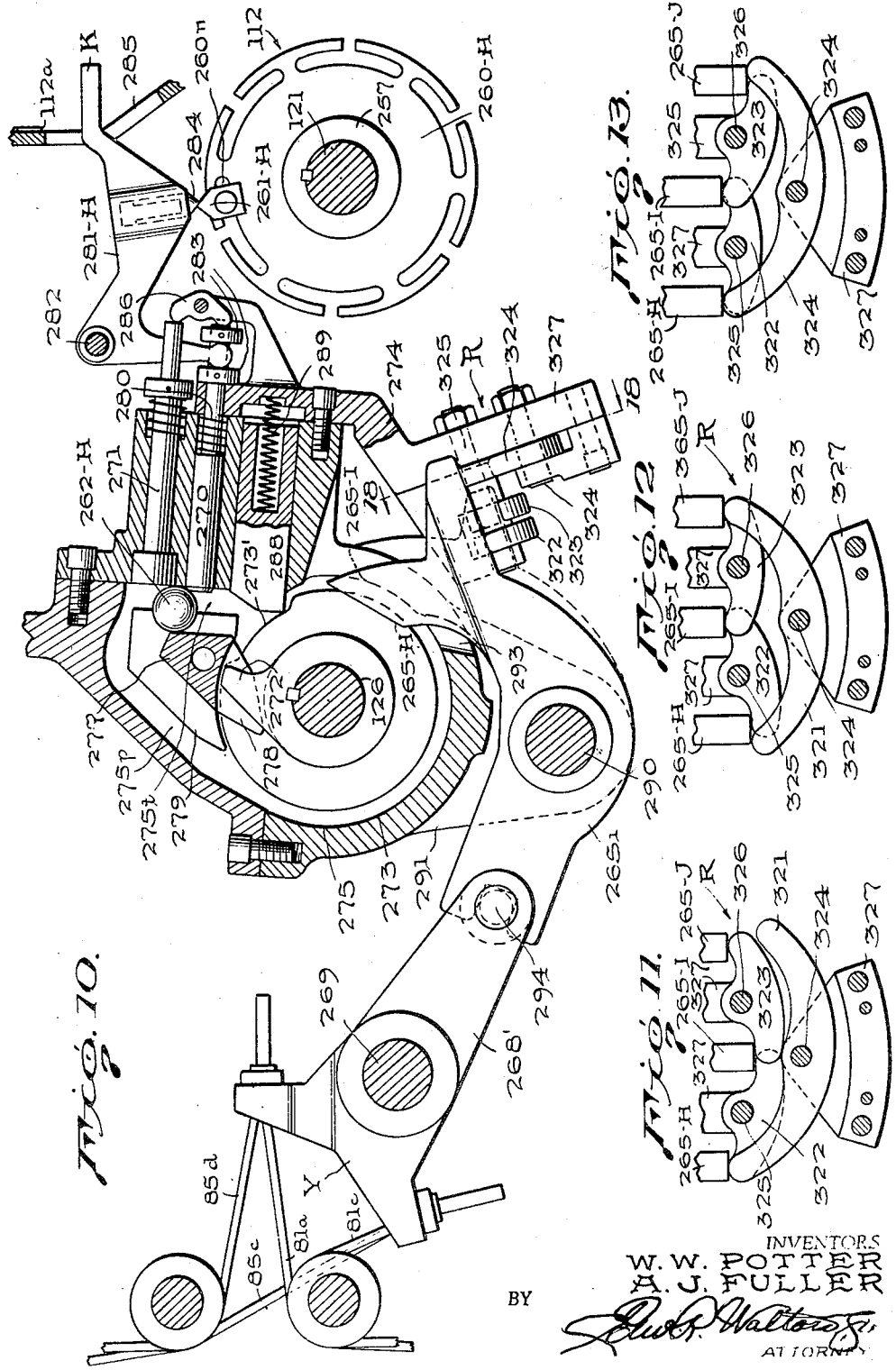

2,571,289

UNITED STATES PATENT OFFICE 2,571,289

MACHINE TOOL

William Wallace Potter and Alfred Joseph Fuller, Pawtucket, R. I., assignors, by mesne assignments, to Niles-Bement-Pond Company, West Hartford, Conn., a corporation of New Jersey Original application May 26, 1944, Serial No. 537,490, now Patent No. 2,455,876, dated December 7, 1948. Divided and this application March 25, 1946, Serial No. 656,929

9 Claims. (Cl. 29—64)

1

The present invention relates to speed control mechanism for machines of any type, particularly machine tools, which have a plurality of operable instrumentalities that may be brought into operation at the same or different times and the speed of which are to vary at different times as required or is desirable for such operations.

This application is a division of application Serial No. 537,490, filed May 26, 1944, now Patent No. 2,455,876, granted December 7, 1948.

The objects of the present invention are broadly to effect a very compact, simplified and improved construction and arrangement—

(1) In the power transmission to the different operable instrumentalities of the machine, such as the spindle and the slide or carriages, or their equivalent, of a machine tool; and further to provide for selectively changing the speed range of the machine independently of any speed change device for changing the speed within any selected range;

(2) To actuate change-speed clutches (for both the spindle and feeding speed in a machine tool) by a mechanical power transmission mechanism (termed a "ball-box"), which in turn is controlled by an improved automatic control device, which replaces a customary large dog drum, whereby clutches may be shifted substantially instantaneously with greater celerity than with other previous used mechanical means and with the expenditure of slight force or power from a comparatively slow movement of the selecting or control device;

(3) Whereby said mechanical power transmission mechanism will interlock the clutches, or their equivalent, employed in the machine in order that, when certain of said clutches, which effect one movement or speed of one instrumentality, are engaged, the other clutches are automatically disengaged;

(4) By employing flexible cables, in said mechanical power transmission mechanism, to operate rocker arms and the like remotely placed for the purpose of actuating clutches from a remotely placed selective control device, thus providing a much more compact and smaller mechanism than is possible with links or rods as the cable can extend through or around other mechanisms, which is not possible with links or rods, and reducing the cost of the machine as well as its maintenance;

(5) In the various and sundry details, a combination and subcombinations of parts hereinafter more fully set forth in the following specification.

2

With the above objects in view, the invention resides in all that is shown and described herein and particularly pointed out in the appended claims.

In the drawings, which show the preferred embodiment of the invention as at present devised and as applied to a turret lathe as one example of its use:

Figure 7 is a longitudinal sectional view taken substantially on line 7—7 of Fig. 6 and illustrates the details of construction of the control device and ball-box mechanism controlling the change speed mechanism of the spindle;

Figure 8 is a view similar to Fig. 7 and is taken substantially on line 8—8 of Fig. 6 to illustrate the details of construction of the control mechanism and the ball box mechanism controlling the operation of the clutching device interposed between the quick traverse motor and the feed change mechanism of the turret slides;

Figure 9 is an elevation of the oscillating lever 264 and its extension legs shown in Fig. 8;

Figure 10 is a view similar to Figs. 7 and 8 and is taken substantially on line 10—10 of Fig. 6 and illustrates the control device and the ball box mechanism controlling the feed-change mechanism of the cross slides;

Figures 11, 12 and 13 illustrate an interlocked device associated with the ball box mechanism for controlling the feed change mechanism of the slides so that when one clutch is engaged the other clutch or clutches will be disengaged automatically, these three figures showing different positions assumed by the interlocked device;

Throughout the specification and drawings, like characters of reference denote like and corresponding parts throughout the several views.

Figure 1:
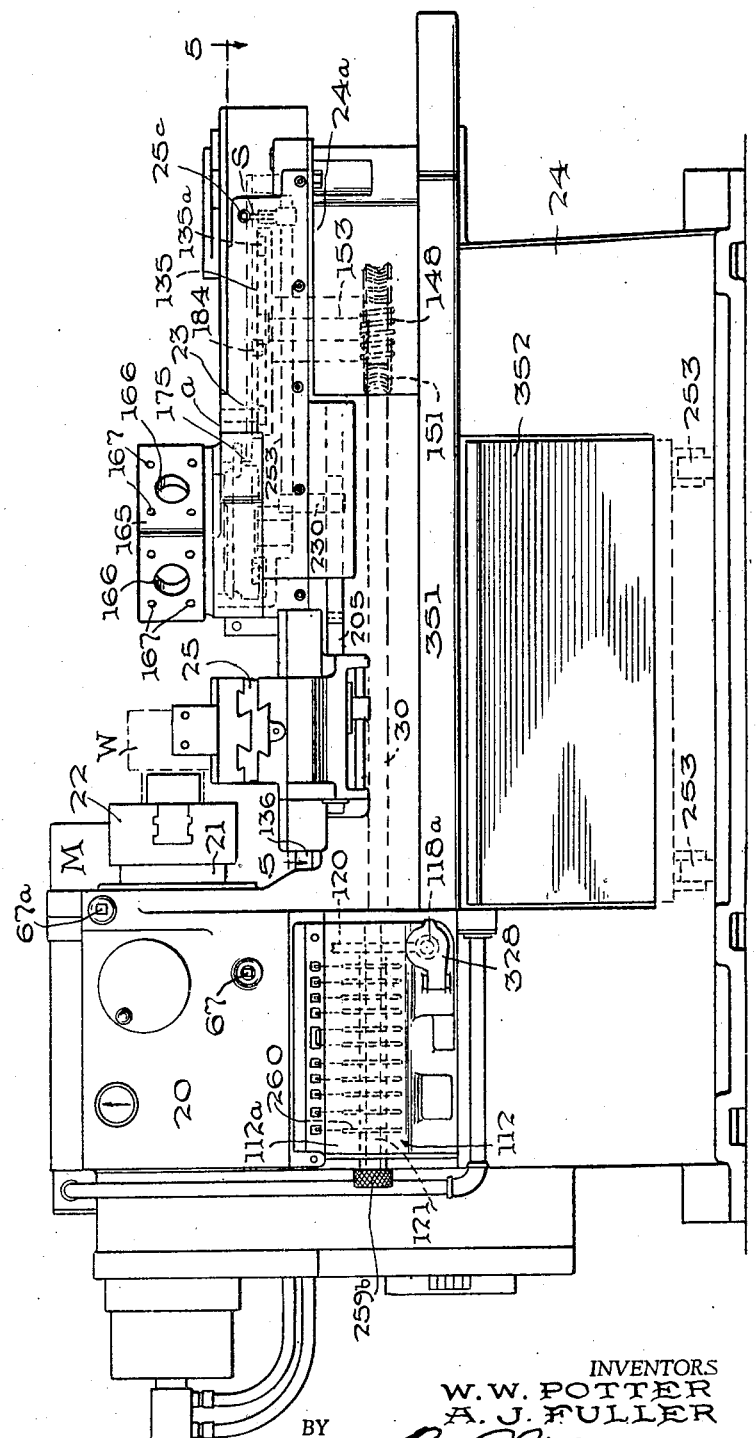
Figure 1 is a front side elevation of a machine tool equipped with the present invention.

In order that a better understanding may be had of the detailed description which follows, a general description will now be given of the machine tool shown in the drawings as one example of a machine to which the invention may be applied.

This machine tool follows the general pattern of organization with the various instrumentalities found in certain of the automatic turret lathes, in that, it comprises a head stock 20 in which is disposed a horizontal work spindle 21 and the variable transmission unit of the machine, a chuck 22 carried on one end of the spindle in cooperative relation with a main slide 23 (which may be a turret slide) mounted on the bed 24 disposed at one side of the headstock 20 and reciprocable to and from the chuck 22 longitudinally of the spinde as well as with the front and rear cross slides 25 and 26, respectively, also mounted on the bed 24 between the chuck and the main slide for independent or simultaneous reciprocal movement at substantially right angles to the movement of the main slide. In this machine tool, the spindle 21 and the feed shaft 30 (which latter operates, through various means, the main slides and the cross slides) are revolved at different speeds which are automatically selected, there being a driving connection between the spindle and feed shaft by which the rate of feed or cutting movement of the tool slides is controlled by the spindle speed. Also, the idle movements of the tool slides toward and from the work are driven at a constant high speed; and the rotation of the spindle may be stopped, under certain conditions during such high speed idle movements of the tool slides, so that the workpiece W in the chuck will not revolve in order that tool marks on the work piece will not occur due to unintentional or accidental contact of the tools with the work during their fast idle motion. Furthermore, the change speed gearing, for varying the rate of rotation of the spindle and of the feed shaft, includes the clutches which are under control of a dog wheel, having a relatively slow peripheral motion, which releases free fast moving bodies that bring into action power-operated clutch-shifting mechanism to instantaneously shift the selected clutches. This instantaneous shifting of clutches is also particularly useful where it is desired to increase the speed of the spindle to compensate for reduction in cutting speed of the tools on the work, for instance, as the tool proceeds from the work piece periphery inwardly, thus enabling more rapid production of work by the machine under certain conditions as where facing cuts are now performed simultaneously with other cuts.

With the above brief general description, the detailed description of the improved mechanism employed by the present invention will now proceed.

HEADSTOCK

Spindle and spindle drive

Figure 2:
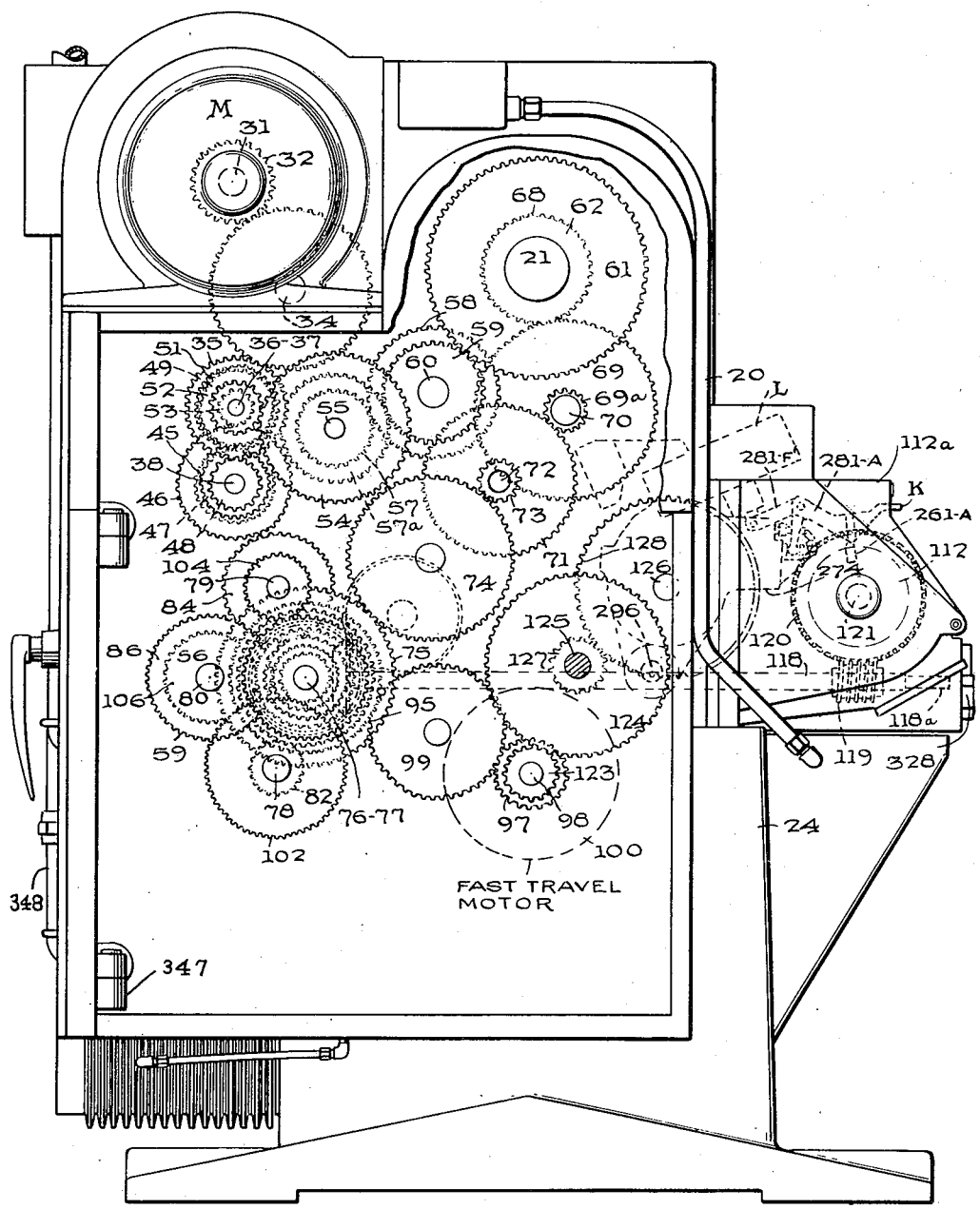
Figure 2 is an end view of the headstock end of the machine, looking from the left-hand of Figure 1, with a portion of the casing broken away to illustrate the gear assembly in the headstock.
Figure 3:
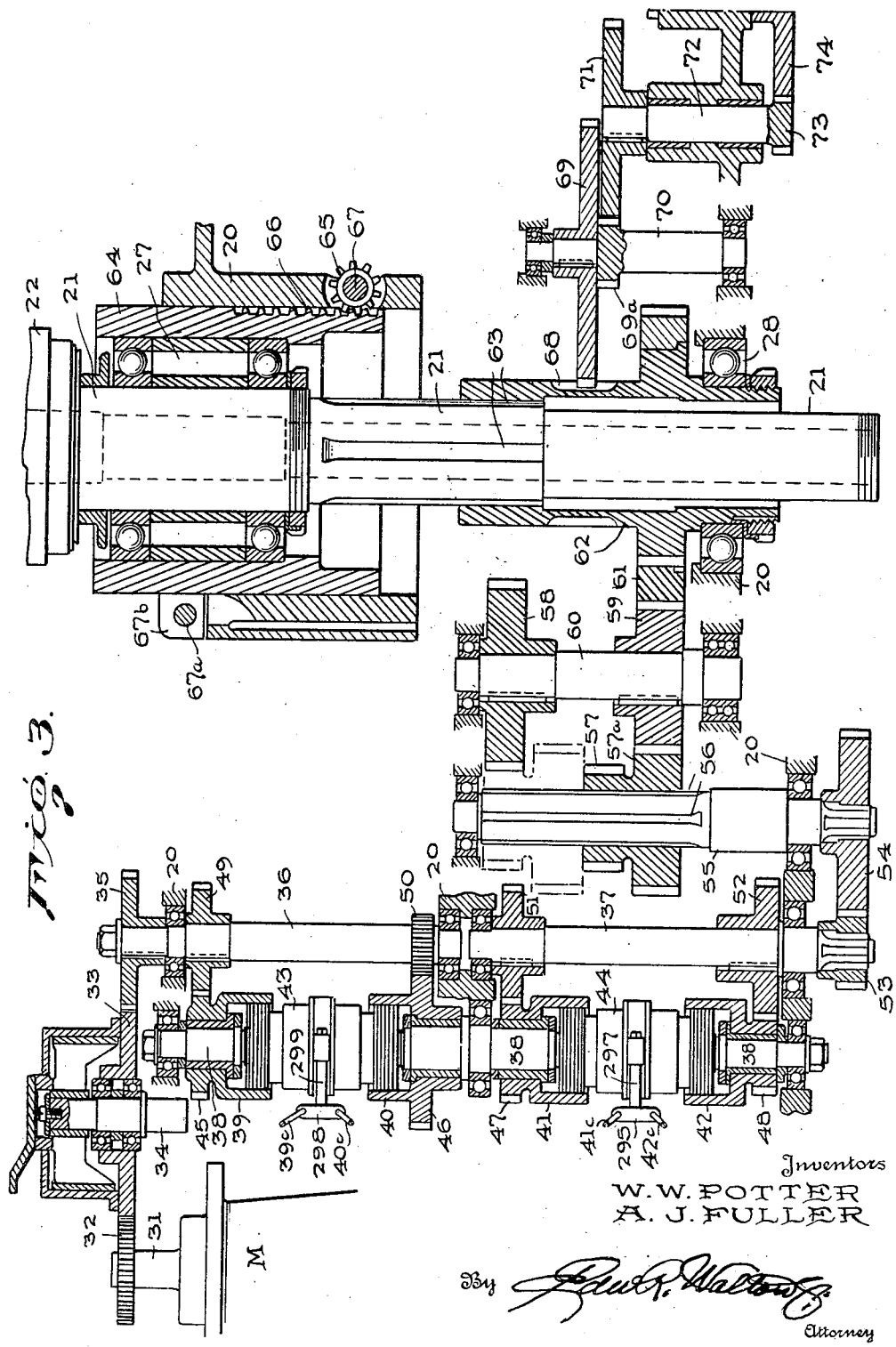
Figures 3 and 4 are to be read together and illustrate the layout of the gearing for driving the spindle and the tool slides, this gearing showing the disposition of the clutches for automatic speed changes of both the spindle and the slides.
Figure 4:
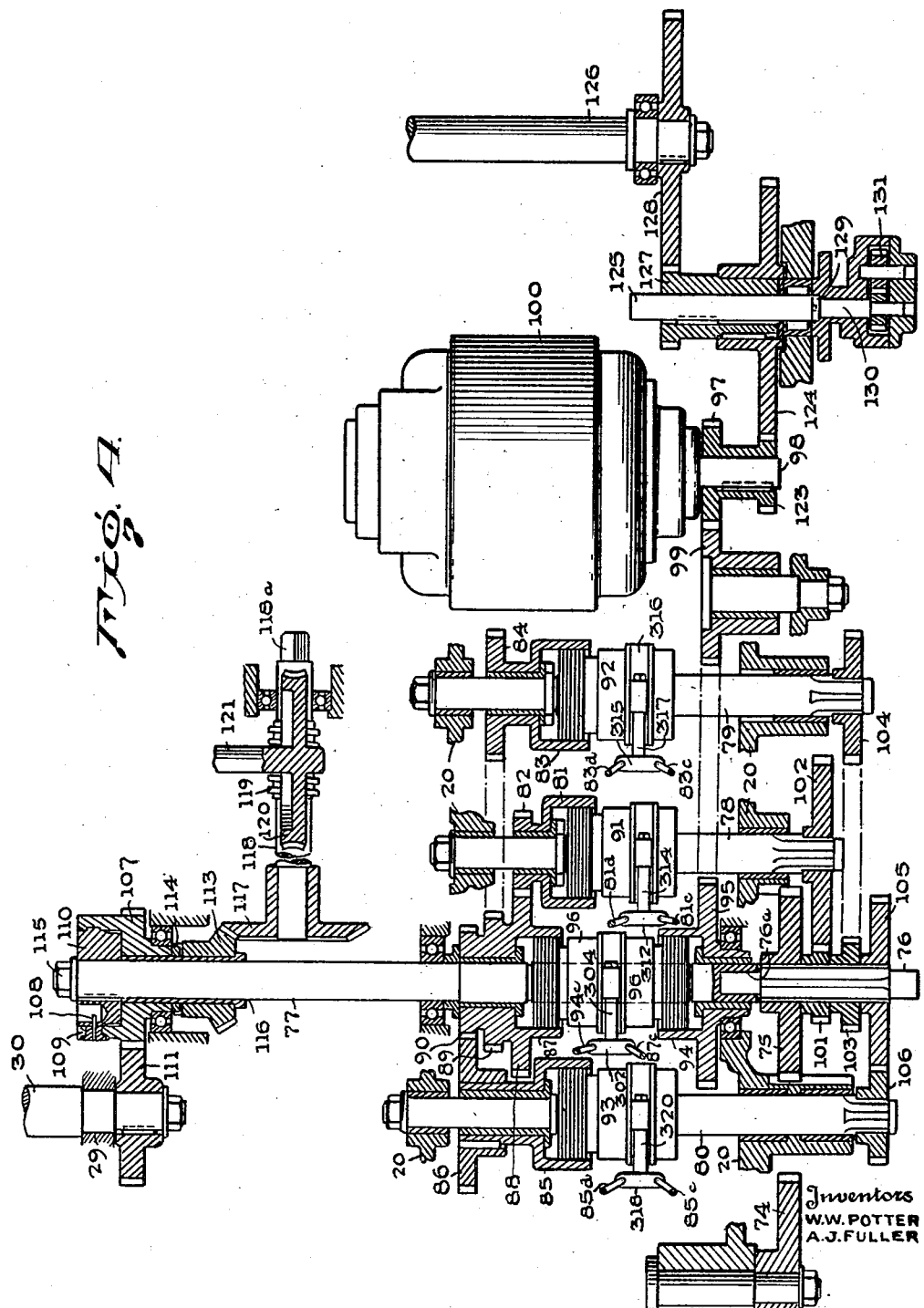

With reference particularly to Figures 1, 2, 3, 4, and 5, the bed 24 of the machine is a casting designed to support and, in some instances, enclose its mechanism, the headstock end 20 thereof being formed to provide a casing for the power-plant motors, transmission mechanism, including the speed and feed change clutches and their selective-control and actuating means, as well as to provide bearings 27 and 28 for the spindle 21 and bearing 29 to the feed shaft 30 (Figs. 3 and 4).

The upper portion of the base 24 provides a table-like member 24a upon which are mounted the turret slide 23 and the cross-slides 25 and 26, the mechanism for operating the said turret slide, which is driven from the feed shaft 30, being disposed above and below the table 24a under the turret slide 23.

The spindle is rotatably mounted in the end walls of the head-stock housing 20 in bearings 27 and 28 (see Fig. 3) and is driven from a constant speed motor shaft 31 actuated from a pulley (not shown) or by an electric motor M supported on an end wall of the headstock casing 20. The drive from the motor shaft 31 is through a gear 32 keyed thereon and meshing with idler gear 33 on shaft 34 which idler gear drives gear 35. These shafts and gears run at constant speed while the machine is in operation. From the driving gear 35, the gearing to the spindle 21 includes four automatic speed changes, one pair of hand-changed gears and shiftable gearing for converting the machine into a low or high speed machine, all of which being shown in extended arrangement in Figure 3 and the gearing for operating the feed shaft, turret-slide, ball-box mechanism, etc. being shown in Figure 4, while the entire gearing in Figures 3 and 4 is shown in its assembled arrangement in Figure 2.

With particular reference to Figures 2 and 3, it will be seen that there are two aligned rotatable shafts 36 and 37 mounted in suitable bearings in the headstock frame and that the driving gear 35 is keyed to one end of the shaft 36 which may be regarded as the speed input shaft and that the shaft 37 may be regarded as the speed output shaft. Journaled in the headstock 20 in cooperative relation and parallel with the aligned shafts 36 and 37 is a rotatable counter-shaft 38 which has rotatably mounted upon it four clutches 39, 40, 41 and 42 arranged in two opposing pairs, each pair being served by a single sliding part of cone, respectively—for instance, clutch heads 39 and 40 being served by the clutch cone 43 and clutch heads 41 and 42 being served by the clutch cone 44—thus, when the clutch cones 43 and 44 are engaged with any one of their clutch heads, the other clutch head of each pair is disengaged. The clutches may be of any suitable type although, in the present showing, disc-clutches are illustrated. The sliding parts or cones 43 and 44 are splined on the shaft 38 and are shifted by suitable yokes, as can be seen more particularly from Figure 3. Each of the clutch heads 39, 40, 41 and 42 have fast therewith gears 45, 46, 47, and 48, respectively, of different sizes to effect the automatic change speeds desired. The gears 45 and 46 of clutch heads 39 and 40 mesh, respectively, with their mating gears 49 and 50 fast on the speed input shaft 36 while the gears 47 and 48 of clutch heads 41 and 42 mesh with their mating gears 51 and 52 fast on the speed output shaft 37. With this arrangement, to obtain the four automatic change speeds, the following operation of the clutches is as follows:

1. To obtain the lowest speed of spindle operation, clutch cone 43 engages clutch head 40 an clutch cone 44 engages clutch head 42. With the parts in this position the drive from gear 35 is through shaft 36, gears 50 and 46 to shaft 38 which rotates gear 48 meshing with gear 52 fast on speed output shaft 37;

2. In order to obtain the second speed of spindle operation, clutch cone 43 remains engaged with clutch head 40 but cone 44 disengages clutch head 42 and engages clutch head 41, the drive then being from speed input shaft 36 through gears 50, 46, shaft 38, gear 47, gear 51 to speed output shaft 37;

3. To secure the third speed of spindle operation, clutch cone 43 engages clutch head 39 (thereby disengaging clutch head 40) and clutch cone 44 engages clutch head 42, if not already in engagement therewith, whereby the drive is from input speed shaft 36 through gears 49, 45, shaft 38, gears 48 and 52 to speed output shaft 37; and 4. To obtain the fourth and highest speed of spindle operation, the clutch cone 43 engages in clutch head 39, if not already in engagement therewith, and the clutch cone 44 is moved in engagement with the clutch head 41, whereby the drive is from speed input shaft 36, gears 49 and 45, counter-shaft 38, gears 47, 51 to speed output shaft 37.

From the above, it will be observed that, during these four automatic speed changes, one of each pair of clutch heads with their mating gears are always engaged while the other two clutch heads with their mating gears are run idle on the counter-shaft 38 and that any combination of two clutches may be engaged simultaneously within the limitation, of course, that when one clutch of a pair is engaged the other clutch of the same pair is disengaged which is a feature of safety as will appear later from the description of the clutch operation mechanism.

The spindle drive continues from the speed output shaft 37 through hand-change gears 53 and 54 to shaft 55. These hand-changed gears are, respectively, fast on the outer ends of the shafts 37 and 55 so as to be accessible for quick manual change through a suitable door in the end wall of the headstock casing 20 and may be provided in groups to obtain different ranges of speeds in a manner and for a purpose well known in the art.

From shaft 55 the machine may be converted from a low speed to a high speed machine, and conversely, but always influenced by the speed changes which are effected by the hand-change gears 53 and 54 and through the automatic clutches just described. By providing shaft 55 with multiple splines 56 on which a double gear 57 and 57a slides and by moving the double gear 57 and 57a manually so that either the low speed gear 57 will mesh with its mating gear 59, such change-over may be effected. It will be observed that gears 58 and 59 are keyed to a jack-shaft 60 and that gear 59 is in mesh with a gear 61 keyed to a jack-shaft 60 and that gear 59 is in mesh with a gear 61 keyed to a sleeve bearing 62 in which the rear end of the spindle 21 is splined at 63 for longitudinal adjustment therein. The sleeve bearing 62, as is the shaft 55 and the jack-shaft 60, is journaled at 28 in the headstock casing 20 in suitable ball bearings.

The front or chuck end of the spindle 21 is journaled in a ball bearing 27 within a bearing sleeve 64, which latter is slidably mounted for longitudinal movement in the headstock housing 20 (see Fig. 3) in order to provide for adjustment of the spindle 21 longitudinally to or from a slide 23 or a turret face on said slide. This adjustment may be accomplished by the provision of a pinion 65 journaled on the headstock and engaging a rack 66 on the spindle sleeve 64, the pinion being operated through a shaft 67 having a squared end extending through the headstock casing 20 (see Fig. 1). The spindle may be held in adjustable positions by the binding bolt 67a connecting opposed lugs 67b of a splitting portion on the housing 20.

*Feed shaft drive*

The drive for the feed shaft 30 (which actuates the turret slide 23 and cross slides 25 and 26) is connected directly with the spindle 21 so that the feed will always be in ratio per revolution of the spindle regardless of the speed of the spindle. This feed drive is taken off of the spindle sleeve 62 (Fig. 3), which has teeth 68 out therein meshing with a gear 69. The gear 69 is keyed to a jack shaft 70 which has a spur gear 69a fast thereto for driving gear 71 keyed to one end of a stub shaft 72 which also has gear 73 fast thereon to drive gear 75 (Fig. 4) through the intermediate gear 74. The gear 75 is keyed to an input speed shaft 76 which is aligned with and rotatably independent of an output speed shaft 77 for the feeding movements of the turret-slide 23 and the cross-slides 25 and 26.

From this input shaft 76, various feed changes may be obtained through the medium of hand-change gears for the tool slides as well as three automatic feed changes of any selected feed obtained by the hand-change gears. As shown in Figures 2 and 4, three separate and independent countershafts 78, 79 and 80 are grouped about the aligned input and output shafts 76 and 77 and suitably journaled in a housing 20. Each of these counter-shafts 78, 79 and 80 has rotatably mounted thereon a clutch head 81, 83 and 85, respectively, each clutch head having a mating gear 82, 84 and 86 fast thereon, respectively, which gears are of different sizes, and mesh, respectively, with a cluster gear fast to a main feed clutch head 87 rotatably mounted on the output speed shaft 77. The cluster gear comprises three gear members 88, 89 and 90 which are in constant mesh with gears 82, 84 and 86, respectively. Also, each of said counter-shafts 78, 79 and 80 has a sliding clutch part or cone 91, 92 and 93, respectively, splined thereon for reciprocating into and out of engagement with the clutch heads on said counter-shafts.

The output shaft 77 has a quick return clutch head 94 rotatably mounted thereon and carrying with it a mating gear 95. The clutch head 94 is in opposed cooperative relation with the main feed clutch head 87 so as to be served by the clutch slide or cone 96 splined on the shaft 77, whereby one of the clutch heads 87 or 94 will be engaged when the other is disengaged or both disengaged when the cone is in a neutral position. The quick return clutch head 94 is for connecting the shaft 77 with the motor 100 for effecting quick idle motions of the tool slides 23, 25 and 26, and, to this end, its mating gear 95 is driven from a pinion 97 fast on the motor shaft 98 through an intermediate gear 99.

The counter-shafts 78, 79 and 80 are driven from the input shaft 76 through hand-change gears (101, 102, 103, 104, 105 and 106) splined on the ends of said shafts so that they can be readily removed manually through a suitable opening in the casing 20 to effect various ratio combinations of speeds between the input shafts 76 and said counter-shafts in a manner well known in the art. With the selection of hand-change gears shown, the fine or first feed counter-shaft 78 of the feeding mechanism is driven by gears 101 and 102; the second or intermediate feed counter-shaft 79 is driven by gears 103 and 104; and the third or coarser feed counter-shaft 80 is driven by gears 105 and 106, all, as above stated, are hand-change gears well known in the art.

The three automatic changes of speed of feed of the tool slides are obtained in the following manner:

1. For fine feed of movement of the tool slides and all of the clutch cones 91, 92 and 93 being out of engagement with their respective clutch heads, the clutch cone 91 is moved into clutching engagement with the clutch head 81 and cone 96 is moved into engagement with main feed clutch head 87, thus the drive being from input shaft 76 through hand-change gears 101, 102, shaft 78, clutch head 81, gears 82, 88, and main feed clutch head 87 to output shaft 77. It may be noted here that the clutch cone 96 is in engagement with the main feed clutch head 87 during all feeding operations and is only moved out of engagement therewith when it is desired to effect the quick idle movements of the tool slides or when the feed mechanism is hand operated for "setting-up" on the machine stopped;

2. For the second or intermediate feed of the tool slides, and cones 91 and 93 being disengaged from their respective clutch heads, the cone 92 is moved in engagement with clutch head 83, thus the drive being from input speed shaft 76, through hand-change gears 103, 104, shaft 79, clutch head 83, gears 84, 89, and main feed clutch head 87 to output shaft 77; and 3. For the third or coarse feed of tool slides and with the clutch cones 91 and 92 disengaged from their respective clutch heads, clutch cone 93 is moved into engagement with clutch head 85, thus the drive being from speed input shaft 76 through hand-change gears 105, 106, shaft 80, clutch head 85, gears 86, 90, and main feed clutch head 87 to output shaft 77.

As will be seen hereinafter, the mechanism which operates the clutch cones 91, 92 and 93 is so interlocked that, when any one of the three clutch cones is operated to engage its clutch head, they automatically disengage any other of said clutch cones that were previously in engagement, this being a safety feature which permits only one of the three feed clutches to be engaged at one time while the other clutch heads and their mating gears run idle on their respective shafts. Also, the counter-shafts 78, 79 and 80 are rotated continuously from the input shaft 76 through their respective hand-change gears while the machine is in operation.

The fast motion of the tool slides 23, 24 and 25 (that is, their idle motion from the time that any tool then in operation has finished cutting and is brought back to clear the subject being machined, the turret indexed, and then moved forward to bring the next set of tools to the subject) is obtained by means of the quick return motor 100, which runs at constant speed continually during operation of machine, through pinion 97 on motor shaft 98 driving gear 99 meshing with mating gear 95 of quick return clutch head 94, which latter is engaged automatically by clutch cone 96, when it disengages the main feed clutch 87, whereby "fast motion" is imparted to output shaft 77. When the tools of the turret slide 23 and/or the cross slides 25 and 26 are again in position for cutting operations on the work-subject, quick return clutch 94 is disengaged and the main feed clutch 87 is engaged by the cone 96 whereby shaft 77 is again brought to feeding motion. When "fast motion" is in operation, cluster gear 88—89—90 runs idle on shaft 77 and shaft 76 runs idle in the end of shaft 77, as shown at point 76a.

From output shaft 77, "feed" or "fast motion" is transmitted to the feed shaft 30 (which operates turret slide 23 and cross slides 25 and 26) through gear 107 loose on shaft 77 but made fast thereto by means of a safety coupling which comprises, in the present instance, a shear pin 108 held in an annular flange 109 on one face of gear 107, and extending into a disc member 110 disposed within the bushing 109 and keyed to shaft 77. Gear 107 drives gear 111 keyed on feed shaft 30. If load exceeds normal operating conditions shear pin 108 breaks thereby protecting the mechanisms of the machine. After cause for abnormal load is removed, a new shear pin 108 is inserted and machine is again ready for operation.

A speed and feed control device 112 (Figs. 1, 2, 6, 8 and 10), which automatically controls the operations of all the clutches and therefore the operation of the tool slides in particular, is also driven from gear 107 by bevel gear 113 having an adjustable drive connector, as at 114, with the gear 107. the connector 114 being interengaging teeth or projections on opposing faces of gears 107 and 113 and held in adjusted fixed engagement by the nut 115 and shoulder 116 on shaft 77. Bevel gear 117 keyed on worm shaft 118 meshes with gear 113 and through worm 119 also keyed on shaft 118 drives worm gear 120 keyed on shaft 121 and drives the central device 112, to which dogs are adjustably fastened that control the automatic operation of the clutches of the machine. It will thus be seen that, by having the gear 107 rotatable on the shaft 77 and coupled thereto by the shear pin 108, the timing between the control device 112 and the feed shaft 30 (and thus the turret slide 23 and the cross slides 25 and 26) will not be altered should any overload, jamming or other incident occur which would cause the shear pin 108 to break.

As shown in Figures 1, 2 and 4, the worm shaft 118 is provided on its outer extremity with a square end 118a to receive a hand-crank, or other instrument, for hand-cranking the machine for "setting-up" purposes as is well understood in the art.

In this connection a safety device 122 (see Fig. 8) is provided whereby the machine cannot be cranked by hand until clutch cone 96 is manually thrown to neutral position so as to disengage shaft 77 from both the main feed clutch 87 and the quick return clutch 94 (see Fig. 4) in order that power to the shaft 77 will be disconnected therefrom during the hand-cranking of the machine. Likewise, while the hand-crank is on the shaft end 118a, clutch cone 96 cannot be thrown into engagement with either clutch 87 or 94. When the crank is removed from the shaft end 118a, the clutch cone 96 can again be operated. While the control device 112 is, of course, operated in timed relation to the position or movements of the tool slides 23, 25 and 26 for reasons that can be well understood, the power transmission device (or ball-box), which is controlled by said control device, actuates the clutch cones automatically and is driven from the constant speed quick return motor 100 through a pinion 123 keyed on the motor shaft 98 and meshing with gear 124 keyed on the stud shaft 125 which is geared to the ball-box drive shaft 126 through pinion 127 and gear 128. Thus, the ball-box shaft 126 is driven at a constant high speed at all times the machine is in operation. Also, stud-shaft 125 is coupled, as at 129, to a pump shaft 130 that operates lubricating gear pump 131.

TOOL SLIDES

As above stated, all movements of the main or turret slide 23 and the cross-slides 25 and 26 are actuated from the feed shaft 30 through a single disc-cam 135, which also indexes the turret, if one is employed on the main slide, and actuates a cross-slide pre-selective device S that renders effective and ineffective the connection for actuating the cross-slide from the movement of the main slide (Fig. 5), all as more particularly shown and described in the patent above mentioned. Briefly, the cam-disc lies within the main or turret slide 23 and is driven from the feed shaft 30 through a worm 148 thereon which meshes with a worm wheel 151 fast on a shaft 153 having its upper end fast with the rotative axis of the horizontally disposed cam-disc 135.

As is common in most all turret lathes, the turret 165 is rotatably mounted about a vertical axis upon the top surface a of the main slide 23 at its forward end—i. e., nearer the spindle 21 and in substantial axial alignment with the chuck 22 on the spindle 21. The turret 165 has a polygonal perimeter about its rotary axis to provide a predetermined number of substantially vertical faces having sockets and thread openings 166 and 167, respectively, for the attachment of tool or other holders, not shown. One or more tools, carried by each face, perform cutting operations at or about the same time upon the subject, to be machined, clamped in the chuck 22 on the rotating spindle 21 during part of the forward movement of the slide 23. There is one forward movement of the slide 23 for each face of the turret 165 in order to complete the cycle of the machine. The number of faces on the turret may vary according to the type of work to be performed by or the intended capacity of any particular machine. In the present showing, the turret 165 is shown as having six faces.

Figure 5:
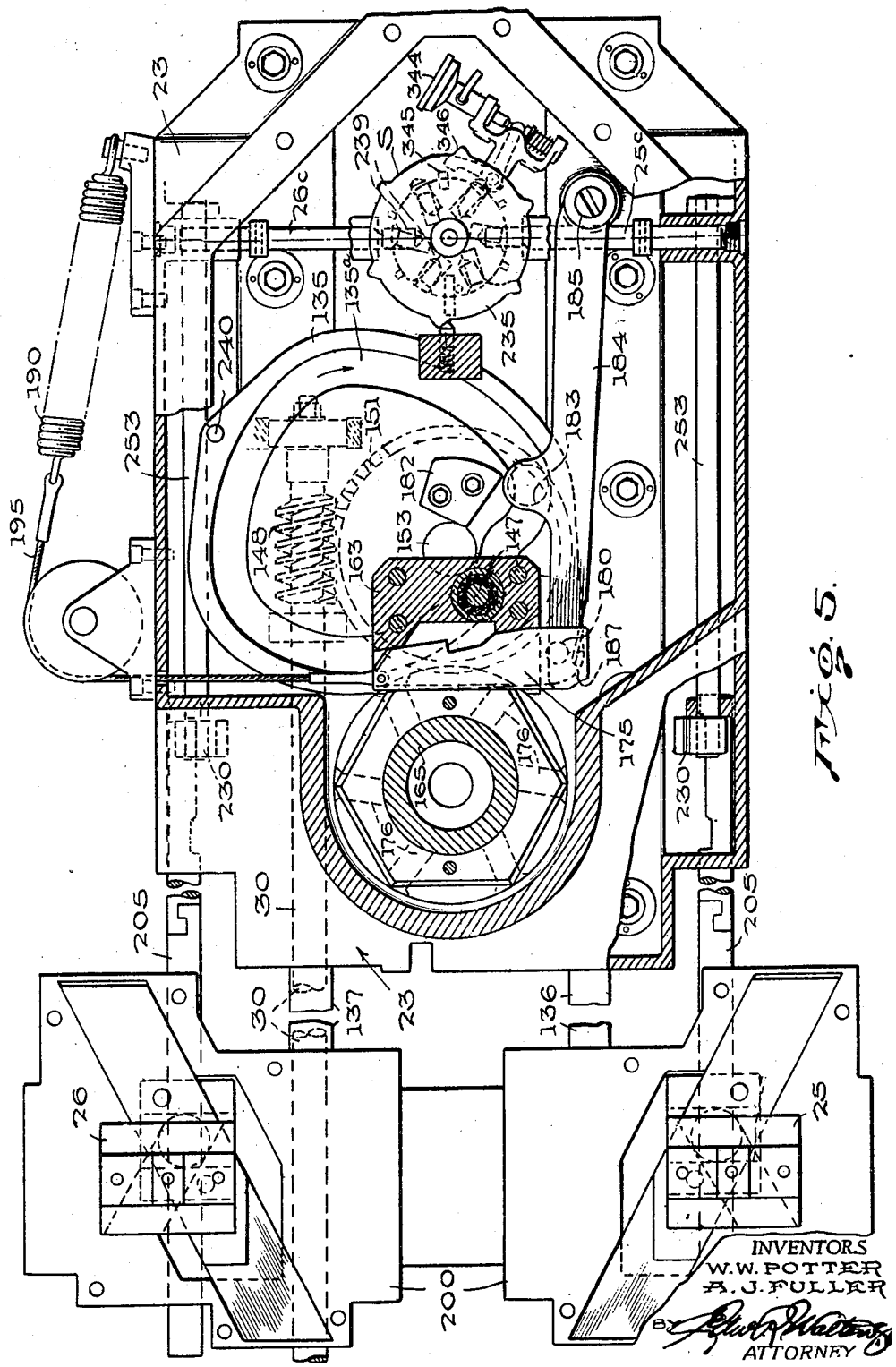
Figure 5 is a sectional view of the turret-slide and cross-slide operating means and taken substantially on the line 5—5 of Fig. 1.

This machine, as are most turret lathes, is equipped with two tool cross-slides 25 and 26 disposed on opposite sides of the chuck 22 and mounted for reciprocatory movement transversely of the axis of the chuck so as to move the tools carried thereby to the work-piece in the chuck to perform certain operations thereupon, and the tools thereafter are returned to a neutral or inoperative position (Figs. 2, 5 and 10).

The reciprocation of the cross-slides transversely of the spindle 21, in this case, however, is derived from the reciprocatory movement of the main or turret slide 23, which is longitudinally of the spindle, through the push rods 253 and 205 and latch 230 and through a simplified and novel arrangement of sliding, rather than rotary, elements (generally indicated at 200) which actuate and control the actuation of the cross-slide positively, accurately and with a maximum of smooth motion and which eliminate a number of required machined and fitted parts and the necessity for complicated timing devices between the main slide and cross-slide— all making for compactness and simplicity in manufacture, assembly, maintenance and manipulation by any operator as fully described in the copending application above mentioned.

The cross-slide control or selective device S is located, for convenience, on the rear end portion of the turret slide, 23, as particularly shown in Figures 1 and 5, and is supported, from the under face of that portion of the top wall of the turret slide which form a removable cover plate a, so that it may be actuated from the cam-disc 135 when the turret slide is in its back or starting position and at or about the time the turret 165 is indexed.

CONTROL AND ACTUATING MECHANISM FOR SPEED AND FEED CHANGES

The control and actuating mechanism for controlling the movement of and for producing changes of speed or rate of movement, both automatically and manually, of the spindle 22 (called the "speed") and of the turret-slide 23 and the cross-slides 25 and 26 (called the "feed")—other than that produced by hand-change gears—is disposed within the headstock 20 below the spindle 21, as generally indicated at 112 on Figs. 1 and 2 by shafts 121 and 126 in Fig. 2. This mechanism is shown in detail more particularly in Figs. 6, 7, 8, 9, 10, 11, 12 and 13 and operates spindle speed clutches 39, 40, 41 and 42 of Fig. 3 and the clutches 81, 83, 85, 89 and 94 of Fig. 4 which control the rate of movement of the turret-slide 23 and cross-slides 25 and 26.

Figure 6:
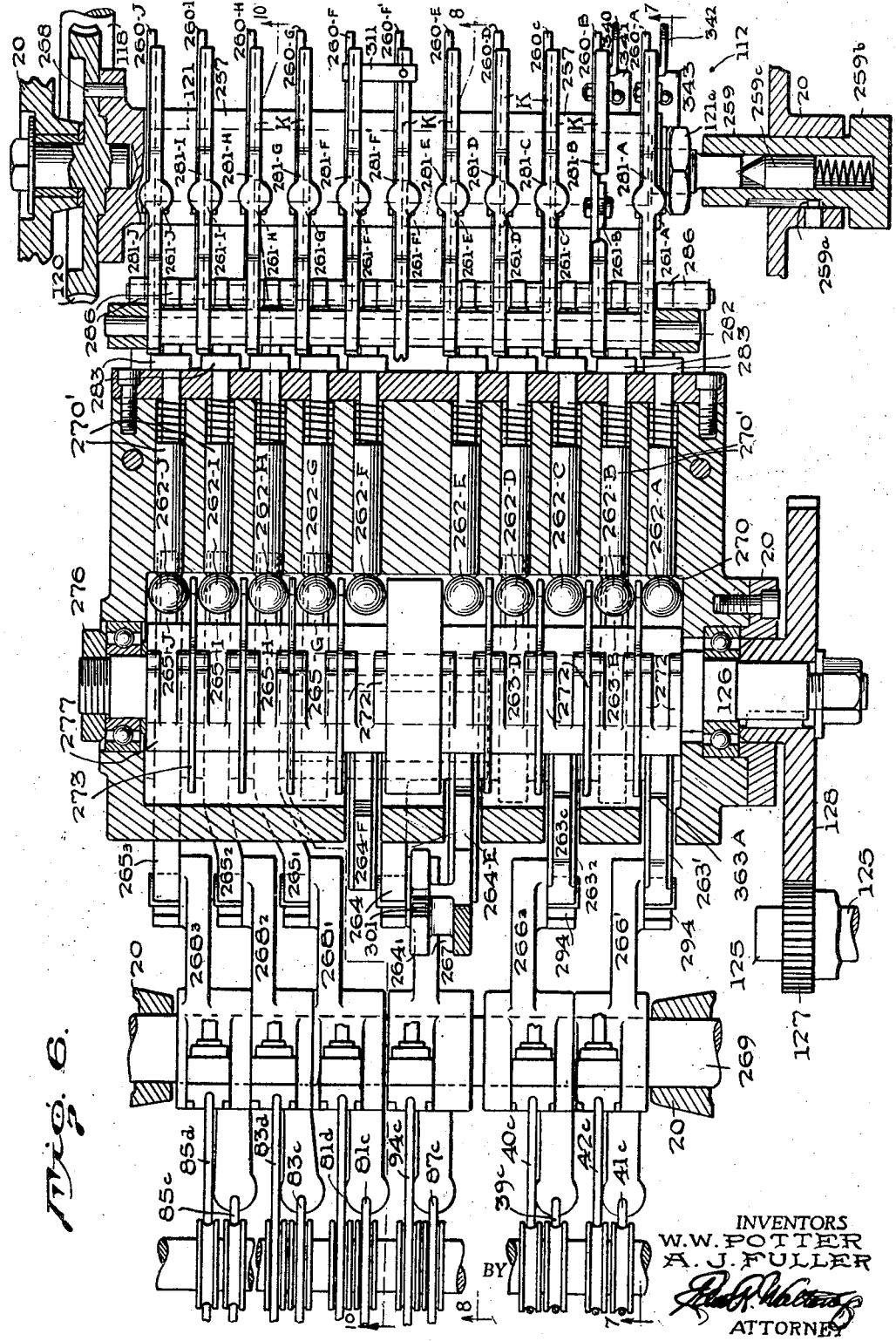
Figure 6 is a horizontal lay-out of the ball box or motion-imparting mechanism, which actuates the change speed device of the drive mechanism of the machine, and of the control mechanism associated therewith, the disposition of this mechanism being shown in Fig. 2 and indicated by the reference characters 112 and 274.

The automatic control device 112 of this mechanism has its shaft 121 driven synchronously with the feed shaft 30 by the gear 107 through gears 113 and 117, shaft 118, worm 119, worm gear 120 fast on shaft 121 (see Figs. 4 and 6 as described above). As shown particularly in Fig. 6, the control device 112 comprises, in part, a plurality of discs 260 keyed to and separated by spacers 257 on the shaft 121, and clamped rigidly together by means of a nut 121ª threaded on one end of the shaft and pressing the assembly against a shoulder at the other end of the shaft, the discs having suitable peripheral slots in which dogs 261 are adjustably clamped.

To perform the functions of the machine tool shown, eleven of said discs 260 are provided; however, more or less of said discs and their associated actuated parts (to be described) may be provided as may be found necessary or desirable to give the requisite speed, feed, fast motion changes, starts and stops for the functions or operations of the machine tool. The reference character of these discs 260 are accompanied by suffix letter characters (A to J inclusive and F') to permit an easier understanding and description of their individual identification and function. Also, the reference characters of parts actuated or controlled by the dogs on each of said discs will be accompanied by suffix capital letters corresponding to those of the disc from which said parts are actuated.

The shaft 121, with its discs 260-A to 260-J and its spacers 257, is supported at one end on an axially projecting hub portion of the worm gear 120 journalled in a stationary part of the headstock casing 20; and is driven therefrom by a coupling pin 258 extending through a flanged end of the shaft and the worm gear 120. Thus, the worm 120 and shaft 121 are connected by a positive drive connection to the turret-slide and cross-slide so that the discs 260-A to 260-J and 260-F' will always be in time with the movement of the turret-slide 23 and cross-slides 25 and 26.

The shaft 121 is supported at its other end by a sleeve 259 slidably mounted in the housing 20 and held in position by a bayonet-lock connection 259a. By means of a knurled head 259b on the sleeve 259, the latter may be turned to release the bayonet lock and allow the sleeve to be pulled out far enough to permit insertion and removal of the shaft 121, and the assembly thereon, from the machine very quickly through a door 112a on the front of the change speed and feed control box. A spring pressed plunger 259c, within the sleeve 259, forces the shaft 121 tightly against the worm gear 120, as shown in Fig. 6, to take up all end play when the bayonet-lock 259a is in locked position.

A feature of this arrangement is that when once the dogs 261 are set for a particular work subject, the control device 112 can be quickly removed from the machine and stored away until such time as the same subject is to be again machined—at which time all that is necessary is to place the tools on their slides and the control device in the machine, thus reducing setting-up time. The only other requirement would be, of course, to see that the proper hand-change gears for the proper "speed" and "feed" are on the machine.

The change-speed control device 112, preferably, in the machine as shown, makes one revolution for each cycle of the machine. Therefore, each disc 260 (A to J and F') may have a dog 261 (A to J and F') adjustably clamped in each of the six elongated arcuate slots 260n therein, arranged end to end about the axis of their discs, respectively, corresponding to the six faces on the turret. Of course, as many dogs will be used in each disc as may be required for a given operation of the machine. However, for purposes of clarity, only one dog is shown in the drawing on each disc, except discs 260-A and 260-B which are provided with additional dogs 340 and 342 set in slots 260m. The latter slots correspond in number with the slots 260n which receive the dogs 260 (A to J and F') and the dogs 340 and 342 are offset laterally from the disc to a greater degree, than the other dogs in slots 260n so as to actuate electrical switches 341 and 343, respectively, and which switches control the main motor M, which drives the spindle 21, turret-slide 23 and cross-slides 25 and 26 through the mechanism shown in Figs. 4 and 4a, to start or stop their operation on any turret face of the turret during the cycle of the machine.

Figure 14:
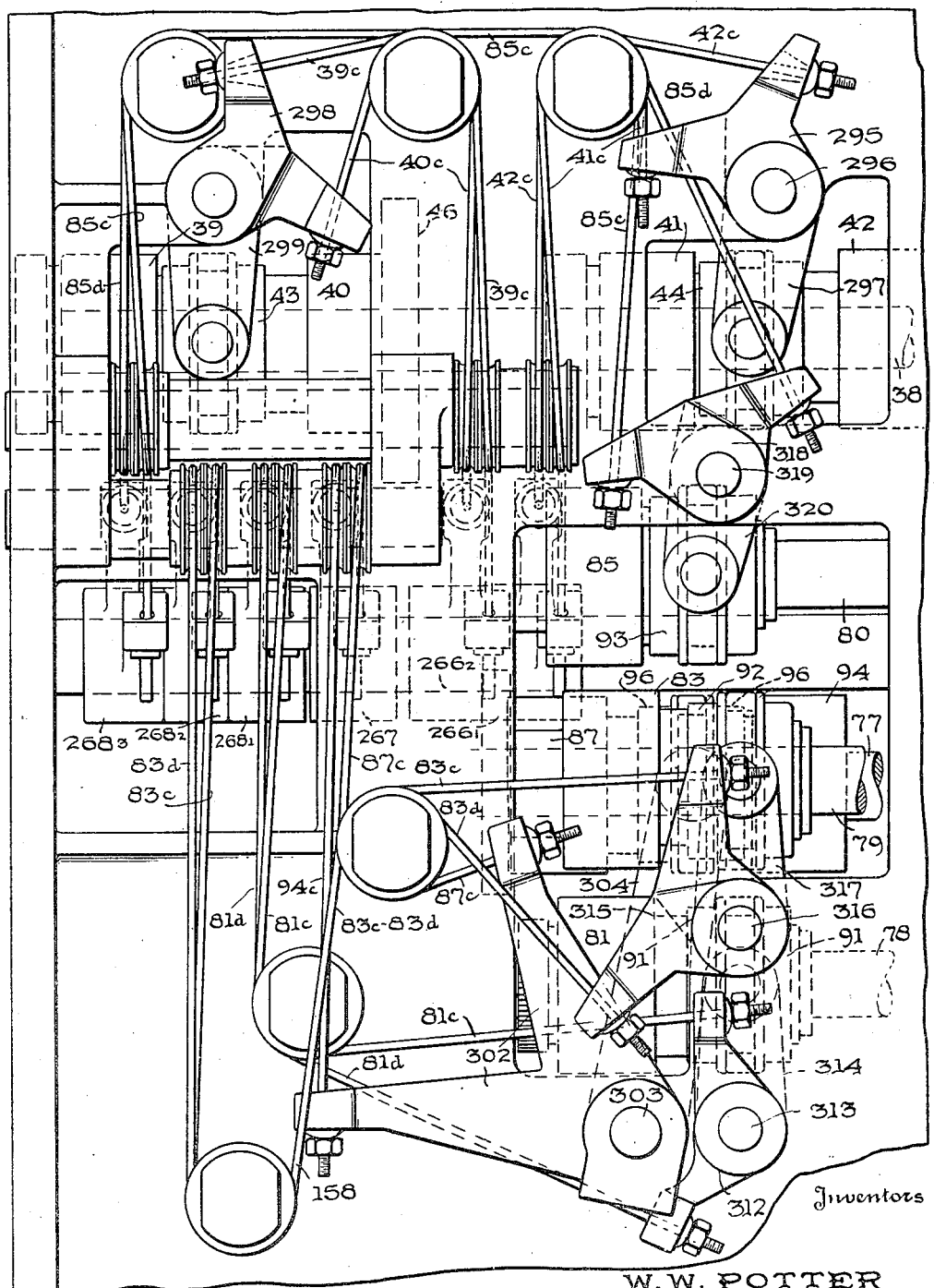
Figure 14 is a fragmentary elevation of the headstock, with the door shown on the lefthand side of Fig. 2 opened, to illustrate the disposition of the various clutch mechanisms and the manner of their control from the ball box mechanism shown in Fig. 6.

Power—for the various operations of the speed-change clutches 39, 40, 41, 42 in the spindle drive (Figs. 3 and 14), of the main feed clutch 87, of the fast travel clutch 94 and intermediate feed clutches 81, 83 and 85—is transmitted to them through balls 262-A to 262-J, which actuate, through a system of levers, connectors 39c, 40c, 41c, 42c, 87c, 94c, 81c, 83c, and 85c (here shown as cables), which operate said clutches, respectively. Each of the balls 262 (A to J) is held in inoperative position by ball releasing means 270, one of said means for each ball; and each of said releasing means 270 is actuated by a dog 261 (A to J) respectively. Thus, the four automatic spindle speed changes are controlled by the dogs 261-A, 261-B, 261-C and 261-D on discs 260-A, 260-B, 260-C and 260-D, respectively; the start and stop of fast travel or quick idle motions and of the feed motions of the turret slide and cross slides are controlled by dogs 261-E, 261-F and 261-G on discs 260-E, 260-F and 260-G, respectively; and the three automatic feed changes are controlled by dogs 261-H, 261-I and 261-J on discs 260-H, 260-I and 260-J. As can be seen particularly in Figs. 6 and 8, there is no ball provided individually for disc 260-F' and its dogs 261-F', which later actuates a slide-bolt 307 to release a spring loaded impeller 305 for only moving the clutch cone 96 from engagement with the fast travel clutch 94 to neutral position, as will be hereinafter described under sub-heading "Start and stop feed and fast travel for turret and crossslides." However, a connection 311 may be provided whereby, when bolt 307 is withdrawn to release plunger 305, ball 262-F is also released to assure that cone 96 does not engage main feedclutch 87, as will also later appear.

*Ball box transmission mechanism*

There is only ball 262 (A to J) controlled by each of the dogs 261 (A to J) respectively. Each of these balls is disposed in an individual raceway and, when released by its releasing mechanism 270, moves into its raceway and makes a substantially circular path to a pocket 275p where it is retained by the release mechanism until again released by the operation of a dog on a corresponding disc 260. The present ball box mechanism is a further development of United States Patent No. 2,225,886.

To this end the shaft 126, shown in Figs. 2, 3, 6, 7, 8 and 10, is driven constantly during operation of the machine from constant speed quick motion motor 100 and has keyed thereon a plurality of collars 271 corresponding in number to the number of balls 262 (A to J). Each collar is provided with one radially projecting and bifurcated or slotted finger-lobe 272 that carries the ball 262 around its raceway, the lobes on said collars being aligned (shown in Fig. 6) for timing purposes, except the lobes which are actuated by the change "feed" balls 262-H, 262-I and 262-J and which are staggered in relation to each other for purposes later explained. It is conceivable that in some instances all the lobes may not be aligned.

Spacers 273 are interposed between each of the collars 271 and are of greater diameter than the collars, thus forming therewith, together with the inner wall 273a of the casing 274, a substantially circular and definite raceway 275 for each of the balls 262 (A to J) respectively. The collars 271 and spacers 273 are rigidly clamped to the shaft 126 by means of a nut 276. Preferably, the upper portion of the casings 274 forms an offset chamber communicating with the raceways and in which is disposed a comb member 277 spaced from the walls of the casing 274. This comb member has pick-up projections 278 thereon spaced from each other so that one of said projections will extend into each of the raceways 275, respectively, and aligned to pass through bifurcation of the lobe 272 in such raceway. The comb is also formed with a plurality of spaced lateral flanges 279, each positioned to lie in the same plane with one of the spacer members 273, respectively, to provide individual ball-retaining pockets 275p. The comb has an upwardly inclined surface on the ball receiving side of the pocket and a substantially vertical wall on its ball discharge side, which latter cooperates with a complemental surface of said offset chamber to provide a drop-throat 275t for said pocket and from which the ball is discharged by gravity into its raceway. Thus, it will be seen that when a ball is released from its position shown in Figs. 6, 7, 8, and 10 it will drop into the raceway 275 and be carried by its lobe 272 around the raceway for a distance of approximately 270°, at which point it will be guided and, by its own momentum, will move over the comb 277 into the pocket 275p where it will be retained in the pocket by its releasing mechanism 270, until the releasing mechanism is actuated by dog 260 on the disc corresponding to said ball.

Each of the releasing mechanisms, heretofore referred to, comprises a pin 270 slidably mounted in a bore in the casing 274 and positioned to be normally projected by a spring 280 into the drop-throat 275t in the path of the ball so as to prevent the ball from dropping from said throat into the raceway 275. Each of pins 270 is operated by one of plurality of shifting levers 281 fulcrumed at 282 and substantially bell-crank in form, these having a suffix capital letter corresponding to the disc and dogs thereon which operate the same. One arm of each lever 281 is positioned between spaced bearing abutments 283 on an end of the release pin 270 projecting exteriorly of the casing 274; and the other arm of said lever is weighted and overlies the corresponding discs 260 so that a yieldably mounted striker 284 positioned thereon will normally lie in the path of its associated dog or dogs 261 on its disc 260. The extremities of the weighted arms of the shifting levers 281 (A to J and F') extend through vertical elongated slots 285 in the door 112a (Figs. 1, 2, 7, 8 and 10) of the casing 20 to provide keys K, whereby the balls 262 (A to J) may be manually released at will.

For quick changing of said clutches, the balls 262-A to 262-J must make only one travel around their respective raceways 275. To insure this as well as against other possible accidents, a check-pin 270' is provided which is similar to and overlies the release pin 270, so when its forward check-end projects into the pocket 275p, it will hold the ball on top of the comb 277, which top surface is slightly inclined toward the drop-throat 275t. The check-pin 270' is biased to have its forward check-end normally lie out of the pocket 275p by spring 287. The construction is such, as shown, that when a ball release pin 270 is withdrawn from its normal position, shown in Figs. 6, 7, 8 and 10, it actuates a teetering lever 286 pivoted on a bracket and having its ends in engagement with the ends, respectively, of pin 270 and the check-pin 270', so as to move the forward end of the latter into the pocket 275p and prevent the ball, after being released in the raceway 275, from re-entering the drop-throat 275t (and thence into the raceway) before the dog 261, which released the ball, moves out of engagement with the striker 284 (or the key K is manually released) to allow the spring 280 to move the pin 270 to its normal ball holding position, as shown.

To prevent a jam—that would be caused by a ball 262 and its lobe 272 on the shaft 126 arriving at a position where a line through the center of radius on end of the lobe 272 and passing through center of the ball and intersecting the surface of drop-throat 275t at or about 90°—a discharge check 288 is provided in the bottom of the throat or each pocket 275 and is in the form of a yieldable block slidably mounted in a recess in the casing 274 below the release pin 270, said slide block being normally urged into said throat by a spring 289 into engagement with the perimetral edge of its adjacent associate spacer 273. The perimetral edge of the spacers 273 is, preferably, a true circle throughout its major portion except for a distance immediately preceding the lobe 272, where the circle is interrupted for a distance but continued on a smaller radius as indicated at 273', thus forming a depression in the perimeter of the spacer having a convex or arcuate surface. Consequently, when a slide block 288 is contacting the perimeter of the spacer 273 on its major radius, the block is pressed against the springs 289 into the housing 274 sufficiently to allow the ball to drop through the throat 275t into the ball race 275; whereas, when the block 288 contacts the smaller radius 273' of said perimeter, it is projected further into the throat 275t by the spring 289 to hold the ball back in said throat until the lobe 272 has passed beyond the throat. Then, when the lobe 272 has passed and the larger radius on the spacer 273 has again pressed the block 288 sufficiently back into the housing, the ball will drop behind the lobe into the ball race 275; whereupon, the next revolution of the lobe will engage the ball and carry it in its course through the race and discharge it into the pocket 275p as above described.

While the comb 277 and the balls 262 are shown vertically over the ball race, they may be placed in any other position. For instance, if the comb is placed in a horizontal or lowered position, the ball would then roll over the comb by gravity and the speed of the shaft 126 could be lowered, if desired.

Now, the oscillatory levers 263', 263², 264, 265', 265² and 265³ will be described (Figs. 6, 7, 8 and 10) and which levers are actuated by said balls 262-A to 262-J and which levers in turn actuate rocker-levers 266', 266², 269, 268', 268² and 268³, respectively. These oscillatory levers are loosely mounted on shaft 290, preferably, disposed under the ball box casing 274 and carried in brackets 291 depending from the end portions of the ball box casing 274. The rocker-levers are loosely mounted on the shaft 269 carried in a suitable stationary portion of the frame or housing 20 and each has one end portion connected to the distal end of their associated oscillatory levers by a pin and notch connection 294 for quick disconnection, while its opposite arm is, preferably, substantially Y-shaped, to each extremity of which are attached a cable, above mentioned. The construction of certain of the oscillatory levers, however, differ from each other due to the functions they perform and may be divided in three different groups as indicated by their main reference numbers.

The two levers 263' and 263² cause the speed changes of the spindle (which latter also drive the turret-slide 23 and the cross-slides 25 and 26) and reference may be had to Figs. 6 and 7, wherein it is shown that these two oscillatory levers are utilized for engaging and disengaging the clutches 39, 40, 41 and 42 (Fig. 3). These two oscillatory levers 263' and 263² are disposed adjacent each other and each has extending from it at opposite sides of its fulcrum point, respectively, two legs portions. Thus, when viewed in elevation, each lever has a substantially U-shape appearance and journalled on the shaft 290 at its intermediate or closed end portion, the two legs being offset with respect to each other to lie in different planes transversely of the shaft 290. The legs of these levers extend through slots 293 in the bottom of the ball box casing 274. The levers 263' have one leg 263-A positioned to move into and out of the raceway of ball 262-A and the other leg 263-B positioned to move into and out of the raceway of ball 262-B but disposed on substantially diametrically opposite sides of the shaft 126. The other lever 263², in a similar manner, has its two offset legs 263-C and 263-D positioned so as its leg 263-C positioned to move into and out of the raceway of ball 262-C and its leg 263-D positioned to move into and out of the raceway of ball 262-D.

*Operation of spindle speed control*

Consequently, when a dog 261-A on disc 260-A raises shifting lever 281-A around its fulcrum 282 withdrawing its release pin 270, ball 262-A will drop in its raceway 275 and its finger-lobe 272, which is rotating at constant speed from motor 100, contacts said ball and carried it around the raceway until leg 263-A is engaged by the ball and moves it out of the ball-path or race, resulting in its lever 263' having moved anti-clockwise on shaft 290 and, in turn, rocker-lever 266' being moved clockwise on a shaft 292. This clockwise movement of rocker-lever 266' pulls cable 42ᶜ, guided by suitable sheaves to rock arm 295 counter-clockwise on stud 296 (see Figs. 3 and 14) whereby yoke block 297 shifts its clutch cone 44 into engagement with clutch 42 and out of engagement with clutch 41.

When a dog 261-B on disc 260-B raises shifting lever 281-B to release a ball 262-B, in same manner as explained in preceding paragraph with respect to balls 261-A, the finger-lobe 272 in the raceway of ball 262-B, then, carries said ball into contact with the leg 263-B, if extending into the raceway of ball 262-B, and moves it out of the path of the ball and simultaneously moves its companion leg 263-A back into the path of its ball 262-A. This movement of the leg 263-B moves its lever 263' clockwise and its rocker-lever 266' anti-clockwise, which latter pulls cable 41c to actuate the rocker-arm 295 clockwise, thereby disengaging the clutch cone 44 from clutch 42 and engaging it with clutch 41.

Likewise, when a dog 261-C on disc 260-C or a dog 261-D on disc 260-D actuates its corresponding shifting lever 281-C or 281-D, respectively, their corresponding balls 262-C or 262-D, the similar operation above described will take place and either cables 40ᶜ or 39ᶜ will be actuated to move the rocker-arm 298 to shift the yoke 299 to engage the clutch cone 43 with either clutch 40 or clutch 39 and disengage the other.

It will be recognized that any one of the combinations of the above described change speed operations can be effected manually by the lifting of the keys K of the shifting levers 281-A, 281-B, 281-C and 281-D.

As mentioned above, under the heading "headstock" subheading "spindle and spindle drive," the four clutches 39, 40, 41 and 42 are arranged in pairs, each pair being served by a single double-acting cone 43 and 44, respectively, so that when one clutch of a pair is disengaged the other clutch of the same pair is engaged. By this arrangement four automatic changes of spindle speed is obtained in the manner above described under said heading. Therefore, since two of the four clutches 39, 40, 41 and 42 must be engaged to obtain any one "speed" and since when the clutch of one pair is engaged the opposite clutch of the other pair is disengaged and since only one leg of either "speed" levers 263' and 263² can be in their respective ball raceways at any one time, should the machine be manually operated through error or should all four of the keys K of shifting levers 281-A, 281-B, 281-C and 281-D be operated simultaneously all that would take place is a change in spindle speed and its accompanying ratio effect upon the said movements of the turret slide and the cross slides if said slides be in operation. This is a safety feature.

*Start and stop feed and fast travel for turret and cross slides*

As is well understood in the art, with this type of machine, the fast travel for idle movements of the tool sides thereof—which in this case is derived from the fast travel motor 100 when the clutch 94 (Fig. 4) is engaged and the main feed clutch is disengaged—is desirable to move the turret and cross slides back from cutting position and then again forwardly, after the turret has been indexed, if indexing is employed, to cutting position, at which time the fast travel or quick motion is discontinued and the movement of the slides then proceeds with relatively slower motion during the cutting operations, commonly known as the "feed."

As explained above, the cross slides 25 and 26 of the present machine derive their motion directly from the motion of the turret slide 23, should either or both of said cross slides be selected for operation, as also above explained. In this machine the turret slide actuating means (i. e. the disc cam 135) does not stop during the indexing movement of the turret, when the slide is in its rearmost position, this indexing taking place during a dwell in the cam path 135ᵃ.

When the motors M and 100 are operating, the starting and stopping of the movement of the turret slide, whether for "feed" or for "fast travel," is accomplished by the dogs on the disc 260-E which engages the fast travel clutch 94, by dogs on disc 260-F' which disengages fast travel clutch 94 through latch device L (and not a ball) and by dogs on disc 260-G which engages main feed clutch 87 and by the ball box mechanism associated therewith, as shown in Figs. 6, 8 and 9. The balls 262-E, 262-F, 262-G, controlled by the dogs on the discs 260-E, 260-F and 260-G, just mentioned, actuate a single oscillatory lever 264 which in turn operates a single rocker 267 which, through its cables 87ᶜ and 94ᶜ, actuate the main double-acting clutch cone 96 (Figs. 4 and 14) to engage and disengage the main feed clutch 87 and to engage and disengage the fast travel clutch 94, or to move said cone 96 to neutral position which latter also includes the operation of disc 260-F'.

The rocker lever 267 is the same as the rocker levers 266' and 266² but the oscillatory lever 264 is of different construction than the oscillatory levers 266' and 266², in that, in addition to the two legs 264-E and 264-G, which effectively operated to engage the fast travel clutch 94 and the main feed clutch 87, respectively, and correspond identically in form with the legs 263-A and 263-B of oscillatory level 263', it has an additional shorter leg 264-F' which is effectively operated by its ball to move the clutch 96 from engagement with main feed clutch 87 to neutral position and which only partially extends into the race of its ball when the leg 264-E is fully in the race of its ball; these three legs being positioned to move into and out of the raceways of balls 262-E, 262-F, and 262-G, respectively. Also, the lever 264 has an arm 264' projecting therefrom to actuate and be actuated by the spring latch device L, which latter is spring loaded by movement of the arm 264' when leg 264-E engages cone 96 with fast travel clutch 94 and which is released by shifting lever 281-F' to disengage said cone 96 from fast travel clutch 94 and move said cone to neutral position.

The latch device L is disposed on the top of casing 274 (Fig. 8) and comprises a cylindrical sleeve 306 rigid with casing 274 and having a plunger 305 therein and normally urged against an abutment 306a on one end of the cylinder by compression spring 309. A rod 305a has its end portions slidably extended through the plunger 305 and the upper end of the latch 264', the end extremities of plunger rod 305a being headed to engage the plunger and latch arm respectively. A spring pressed detent 300 is carried in bracket 300a mounted on cylinder 306 and is positioned to engage in V-shaped notch 301 in distal end of latch arm 264' when the latter is in a position intermediate the full-line and dotted-line positions shown in Fig. 8. When latch arm is in its full-line position and loads spring 309, and plunger 305 is locked in this position by spring pressed slide-bolt 307, entering groove 308, until released in a manner to be explained. When so released, plunger is moved by spring 309 to contact stop abutment 306a thus moving latch arm 264' and its notch 301 to their intermediate position where detent 300 enters said notch. Movement of the latch arm 264' to its dotted-line position, and which may cause rod 305a to move therewith, is allowed by opening 306b in the cylinder 306.

Assume that the machine is at rest with its turret-slide 23 in its rearmost position and it is desired to start the machine with turret-slide approaching the workpiece W in fast travel until the tools on the turret (or cross-slides) reach a point where slower cutting "feed" is required; and, further assume that the fast travel clutch 94 is disengaged with its coacting cone member 96 held in neutral position by a dent 300 (Fig. 8) engaging in V-shaped notch 301 in the distal end of the latch extension arm 264'. With the latch arm 264' in this intermediate position, the leg 264-E extends partially into the raceway of its ball 262-E; and, although the leg 264-F is on the same side of shaft 126 as leg 264-E and rigid on lever 264, it is slightly shorter than leg 264-E also rigid on lever 264 so as not to extend into the raceway of its ball 262-F when its latch arm 264' is in the neutral position just mentioned.

Now a starter push-button (not shown) is operated to close a circuit to the main drive motor M and to the fast travel motor 100 (Figs. 3 and 4) whereby the spindle is driven, but the turret slide 23 and cross-slides 25 and 26 remain stationary because the main feed clutch 87 is disengaged as its coacting cone 96 is in neutral position, and whereby the fast travel motor 100 rotates the shaft 126 and the clutch 94.

Then by manually lifting key K of shifting lever 281-E ball 262-E is released in a manner above explained, and its finger-lobe 272 rotating with shaft 126 carries the ball to contact leg 264-E moving lever 264 counter-clockwise of shaft 290 causing rocker-lever 267 to move clockwise on its shaft 269. Cable 94c anchored at the upper Y-end of rocker-lever 267 moves rocker-arm 302 clockwise on stud 303 (Figs. 4a and 21) shifting cone 96, through yoke 304, from neutral position to engagement with fast travel clutch 94. Thus, the feed shaft 30 is driven through clutch shaft 77 from the motor 100 to move the turret slide at a fast rate of speed and the control dog shaft 121 is driven from the feed-shaft 30. This counter-clockwise movement of lever 264 also causes latch-arm 264' to move, to the full-line position shown in Fig. 8, pulling plunger 305 in sleeve 306 so spring pressed slide-bolt 307 will enter groove 308 in the plunger and hold the latter against the compression of spring 309. It will be noted, that, now, leg 264E and 264F of lever 264 are out of their ball races and leg 264G is in its ball race, as shown in full-lines in Fig. 8.

In the meantime and since control dog shaft 121 is rotating, dogs suitably placed on disc 260-A, 260-B, 260-C and 260-D, will select the required spindle speed, as above described.

When the turret slide and/or the cross-slides have reached their cutting position, a dog 261-F" on disc 260-F" lifts shifting lever 281-F' about its fulcrum 282 and by its arm 281' withdraws slide bolt 307 against its spring 310, whereby allowing spring 309 to move plunger against abutment 306 and, hence, the latch arm 264' to its intermediate position where the detent 300 engages in notch 301. This movement is sufficient to cause the lever 264 to operate cable 87c that moves rocker-arm 302 counter-clockwise and, through yoke 304, disengages the cone 96 from the fast travel clutch 94 and moves said cone to neutral position. Also, this movement of the latch arm 264' moved leg 264-E partially into the race of its ball 262-E so that fast travel could be resumed immediately—automatically by operation of a dog on disc 260-E or manually by operation of key K on shifting lever 281-E, if that should be desired.

Whenever the shifting lever 281-F' (which of itself does not control a ball but only the slide-bolt 307) is lifted, either automatically or manually, to shift cone 96 from engagement with fast travel clutch 96 to neutral position, it always is desirable to operate shifting lever 281-F which releases ball 262-F to contact leg 264-F, should the latter have entered the ball raceways, in order to assure that the cone 96 is not in engagement with main feed clutch 87, the ball 262-F operating to disengage clutch 87, as will be later explained. Therefore, whenever shifting lever 281-F' is lifted the bar 311, secured thereto and extending under portion of key K of shifting lever 281-F, also lift the latter to release its ball 262-F. However, shifting lever 281-F' may be lifted independently of shifting lever 281-F' as can be seen.

Now, that the fast travel of the tool slides has been arrested, to carry out the above assumed operation, a dog 261-G will be positioned on its disc 260-G as to contact its shifting levers 281-G immediately after the shifting levers 281-F and 281-F' have been operated (or it may be simultaneously therewith) so as to release its ball 262-G to contact the leg 264-G, which now partially extends, within its ball raceway, thus moving lever 264 clockwise which moves rocker-lever 267 counter-clockwise pulling cable 87c anchored to its lower Y extremity, rocking lever 302 anti-clockwise (in Fig. 14) and, by yoke 304, moving cone 96 into engagement with main feed clutch 87 which, through shaft 77, drives feed shaft 30, and hence the tool slides, at a feeding rate of speed. This feeding rate of speed, however, may be changed further by operation of clutches 81, 83 and 85 which drive through the main feed clutch 87, as will be explained under the next heading.

When leg 264-G was contacted by its ball it was moved completely out of its raceway and both legs 264-E and 264-F were moved in their respective raceways, whereby they may be effectively operated by their respective balls, and the latch arm 264' was moved from its intermediate position to its dotted-line position (Fig. 8).

The tool slides having completed their feeding movement toward the work piece, the next movement is to quickly return them to their rearmost position away from the work piece, at which point the turret slide is indexed to bring another face of the turret opposite the work piece, as is well understood in the art.

This backward fast travel of the tool slides is accomplished by a dog 261-E on disc 260-E raising shifting lever 281-E to release its ball 262-E in a manner explained above. The ball is then carried around in its race by its lobe 272 on shaft 126 and engages leg 264-E, rotating oscillatory lever 264 counter-clockwise which, in turn, rotates rocker lever 267 clockwise thereby pulling cable 94$^c$ to rotate rocker arm 302 clockwise to move clutch cone 96 to disengage main feed clutch 87 and to engage fast travel clutch 94 by reason of the fact that the leg 264-E extended fully within its ball raceway and had sufficient movement to throw the cone 96 from one clutch to the other without stopping in its intermediate or neutral position. It will be observed also that this movement of the leg 264-E moves latch arm 264' to full-line position shown in Fig. 8, at which position the plunger 305 is locked by the slide bolt 307 against the compression of spring 309.

The tool slides, by reason of this operation, travel back from the workpiece to their rearmost position—unless the operation of the entire machine is stopped at this point by dog 342 on disc 260-A engaging stop switch 343 or the movement of the slides is arrested by the operation of the shift lever 281-F' (automatically or manually) to move the clutch cone 96 in neutral position—and will be again moved forward by operation of the disc cam 135 in fast motion toward the workpiece, after the turret has been indexed, as above explained.

Should it be desired to stop the movement of the tool slides, while they are in their slow cutting "feed"—i. e., when the parts 264, 264-E, 264-F, 264-F', 264-G and 267 are in their dotted-line positions shown in Fig. 8—a dog 261-F' properly positioned on disc 260-F will raise shifting lever 281-F releasing ball 262-F which will be carried around its race by lobe 272 to contact leg 264-F moving lever 264 counter-clockwise and rocker-lever 267 clockwise sufficiently to pull cable 94 to shift clutch cone 96 out of engagement with clutch 87 to neutral position. This movement of lever 264—because of the shortened ball contact face of its leg 264-F which at any time only partially extends into its ball race—also moves the distal end of latch arm 264 to an intermediate point where the detent 300 engages notch 301 to yieldably maintain the neutral position of cone 96.

*Speed change feed clutches*

It is, of course, desirable and required that the rate of "feed" movements of the tool-slides 23, 25 and 26 be changed for different operations with respect to the rotation of the spindle 21. This is accomplished by change-feed clutches 81, 83 and 85 driven from the spindle and which produce three automatic changes of "feed" which drive the clutch shaft 77 and the feed shaft 30 through the main feed clutch 87, when the latter is engaged by cone 96, as described in connection with Fig. 4. These clutches 81, 83 and 85 are controlled automatically by dogs 261-H, 261-I and 260-J on control shaft 121 and manually by keys K on shifting levers 281-H, 281-I and 281-J, associated with said discs respectively, and which control ball 262-H, 262-I and 262-J, respectively.

This mechanism, shown in Figs. 6, 10, 11, 12 and 13, is the same as previously described, including the ball-release and checking members 270, 270' and 288 and the raceway construction, as can be seen. However, the oscillatory levers 265', 265$^2$ and 265$^3$ are different from those previously described; although they are similar to lever 263' and 263$^2$, except that lever 265', 265$^2$ and 265$^3$ each have only one arcuate extension leg—i. e., 265-H, 265-I and 265-J, respectively—whereas lever 263' and 263$^2$ each has two in opposing positions. Each leg 265-H, 265-I and 265-J extends through slots 293 in casing 274 to move into and to be effectively actuated in a counter-clockwise direction (Fig. 10) out of their raceways 275 by their respective balls 262-H, 262-I, and 262-J.

Oscillatory lever 265', 265$^2$ and 265$^3$ each have a pin connection 294 with the rocker levers 268, 268$^2$ and 268$^3$, respectively, which are identical with the rocker levers 266', 263$^2$ and 267 and which, in Figure 10, are moved clockwise to cause their respective change-feed clutches 81, 83 and 85 to be engaged when their oscillatory levers are effectively actuated by their respective balls. To this end, cable 81$^c$ is connected to the lower Y-extremity of rocker-lever 268' and passes over guide sheaves to rocker arm 312 (Figs. 4 and 14), journalled on stud 313 and connected to yoke 314, to move clutch cone 91 into engagement with first or fine feed clutch 81, while the cable 81$^d$ is connected to the upper extremity of the Y-end of rocker-lever 268' and passes over guide sheaves to the other end of rocker arm 312 so as to disengage clutch cone 91 from fine feed clutch 81. In like manner, the Y-extremity of rocker lever 268$^2$ are connected by cables 83$^c$ and 83$^d$ to opposite ends of rocker-arm 315 on stud 316 operating yoke 317 to shift cone 92 into and out of engagement, respectively, with the second or intermediate change-feed clutch 83. Also, in like manner, cables 85$^c$ and 85$^d$ are connected to extremities of the Y-end of rocker lever 268$^3$ and are connected to opposite ends or rocker arm 318 journalled on stud 319 to operate yoke 320 which moves clutch cone 93 into and out of engagement, respectively, with the third or change-feed clutch 85.

As gears 82, 84 and 86 are constantly in mesh with cluster gears 88, 89 and 90 (Fig. 4) only one of the feed-clutches 81, 83 or 85 should be engaged at one time. To make it impossible to engage more than one of these feed clutches at any time, a mechanical interlocking means R is shown in detail in its several positions in Figs. 11, 12 and 13 and is shown associated with the oscillatory levers 265', 265$^2$, and 265$^3$. This interlock means R may comprise three teeter-levers 321, 322 and 323, journalled at 324, 325 and 326, respectively, in a bracket 327 suspended from ball-box casing 274 and underlying outwardly extending lugs, one on each of the oscillatory lever leg extensions 265-H, 265-I and 265-J. The teeter-lever 321 has its two ends arranged to engage and to be engaged by legs 265-H and 265-J, respectively, while teeter-lever 322 has its two ends arranged to engage and to be engaged by legs 265-H and 265-I; and teeter-lever 323 has its two ends arranged to engage and to be engaged by legs 265-I and 265-J. Thus, if one of said oscillatory levers is effectively actuated by its ball to move clockwise out of the ball race to its dotted-line position (Fig. 10) to cause the engagement of the corresponding feed clutch, it will depress the contiguous ends of its associated teeter-levers (i. e., as leg 265–I has been so actuated as shown in Fig. 11, or as leg 265–H as shown in Fig. 12, or as leg 265–J as shown in Fig. 13) and cause the other ends of said associated teeter-levers to shift the other oscillatory lever legs 265–H and 265–J in Fig. 11; 265–I and 265–J in Fig. 12 or 265–H and 265–I in Fig. 13 counter-clockwise to full-line positions in Fig. 10, whereby the latter legs move their associate rocker-levers clockwise on shaft 269 pulling cables 81$^d$, 83$^d$, or 85$^d$ to disengage their respective change feed clutches.

The keys K of shifting levers 281–H, 281–I and 281–J may be lifted by hand to accomplish any desired change of feed manually. To eliminate danger of jamming, if the operator should accidentally operate two or three of feed shifting levers at one time, the finger-lobes 272, which coact with balls 283–H, 282–I and 282–K, are staggered or radially spaced in relation to each other in such a way that one of the lobes will carry its ball to fully operate its associated oscillatory lever leg 265–H, 265–I, or 265–J before the next succeeding lobe will have carried their ball to operate their respective oscillatory lever legs. It is preferred to have only one lobe 272 in the race ways of balls 262–H, 262–I, and 262–J; however, it may be desirable to provide more than one lobe in connection with the other raceways that have been previously described.

*Hand cranking*

As is well understood in the art, it is desirable and necessary to handcrank the machine during "setting-up." As previously mentioned, this is accomplished by rotating shaft 118 by means of handcrank applied to the square and 118–A of said shaft and, in this manner, the tool slides may be manually operated. It is absolutely necessary, however, for safety reasons, to have the machine stopped when handcranking and to be unable to start the machine again until the crank has been moved from end 118–A of shaft. To this end, the crank end 118–A of shaft line 118 is positioned near the front of the machine and is covered by a cap 328 hinged on the headstock casing 20 (Figs. 1, 2 and 8), the hinge lug of the cap being provided with a cam surface 329 against which one end of a rod 330, slidably mounted in bearings in the housing 20, is held by spring 331. The rod 330 has fast thereon electrical contacts 332 normally held in contact with switch 333 by spring 311, when the hinge cap 328 is closed, the switch 333 being in series with the electrical supply circuit to the spindle motor M and to the fast travel motor 100.

As can be seen from Fig. 8, when the hinged cap 328 is opened for permitting the application of the crank to shaft 118 or for any other reason, the rod 330 is moved inwardly against the spring 331 and actuates bell crank 334 to raise lock pin 335 so that its upper end will extend between the collars 283 of the slidably ball-release pin 270, thereby locking the latter against releasing its ball into its raceway. The lock pin 335 is normally biased by spring 336 to assume the full-line position out of engagement between said collars 283.

There are two of said bell crank levers 334 fast on the shaft 337 and two lock pins 335, one set being arranged along the shaft 337 so that one lock pin will lock the bell-release pin 270 of ball 262–E that causes the fast travel clutch 94 to be engaged and the other to lock the ball-release pin 270 of ball 262–G that causes the main feed clutch 87 to be engaged and thus preventing the spindle or the slides to be motor driven. It is obvious that, when the cap 328 is closed, spring 331 will close the switch 333 allowing motor spindle to be actuated and springs 336 will cause their lock pins 336 to unlock their ball-release pins 270.

The striker 284 on the shifting levers 281–A, 281–J, and 281–F' are yieldably mounted, as indicated in Figs. 7, 8 and 10, so as to allow the dogs 261–A to 261–J and 261–F' to depress the same should a jam of any kind occur in the machine and, particularly, to allow the discs 260–E and 260–G to freely rotate with their dogs thereon, when the shifting levers 281–E and 281–G become locked as a result of the pin 235 entering between the collars 283 on their ball-release pins 270, while the cap 328 is opened during handcranking as explained in the preceding paragraph.

As shown in Figure 5, a lubricating pump 344 may be intermittently operated by the cross-slide selector device S, through projections 345 on the rotatable wheel 235, which projections actuate a spring-pressed trip 346 of the pump assembly mounted in a bracket attached to the bed 24$^a$. A coolant pump 347 (Fig. 2) with suitable piping 348 is also provided.

A chip truck 352 is located in a recess in the base or bed 24 under the chip-pan 351 and to underlie the clutch 22, cross-slides 25 and 26 and the turret (when the latter is in cutting position), the chip-pan having an opening therein commensurate with the chip truck 352. The bottom of the truck is equipped with wheel 353 so that a slight lift on the rear side and with the wheels at its front side, the truck can be wheeled readily out through the rear side of the base.

Having thus described the invention in the manner in which it is to be performed, it is to be understood that the precise construction and arrangement shown and described is susceptible of modification and variation. Therefore, the invention in many respects has been claimed broadly so as to permit such variation and change and, in other instances, more specifically.

That which is claimed as new is:

1. In a machine tool having a reciprocable tool-slide, a drive for reciprocating said slide at different slow speeds and at a high speed, a disconnectible device interposed between said slow speed mechanism and said quick motion means for the slide, whereby said drive means may be driven from the slow speed mechanism or the quick motion means or disconnected from both; in combination with a selectable control device for operating said disconnectible device and including a power-receiving member connected with said disconnectible device and movable in opposite directions to disconnect said quick motion means from the slide drive means and connect the latter with the said slow speed mechanism, when moved in one direction, and conversely, when operated in the other direction, contact means on said power receiving member to alternately extend into and be removed from paths of movement, according to the position of the power-receiving member, whereby the disconnectible device is moved alternately to the two positions mentioned; and other means on said power-receiving member dimensioned and arranged to partially extend into another path of movement, when one of said first mentioned of said contact means extends fully within the path of movement with which it cooperates, to disengage said disconnectible member and move it to neutral position, when contacted; and a moving body for each of said paths of movement to contact said contact means of said power-receiving member to actuate the latter; and a pre-set selective control means for releasing said bodies at predetermined times.

2. In a machine tool having a reciprocable tool-slide, a drive means for reciprocating said slide at different slow speeds and at a high speed, a disconnectible device interposed between said slow speed mechanism and said quick motion means for the slide, whereby said drive means may be driven from the slow speed mechanism or the quick motion means or disconnected from both; in combination with a selectable control device for operating said disconnectible device and including a power-receiving member connected with said disconnectible device and movable in opposite directions to disconnect said quick motion means from the slide drive means and connect the latter with the said slow speed mechanism, when moved in one direction, and conversely, when operated in the other direction, and further including at least three ball raceways and a releasable ball for each raceway; said power-receiving member having three leg extensions fast thereon, two of which being oppositely coacting so that when one is in its raceway the other is out of its raceway for moving said disconnectible device alternated to the two positions mentioned; and the third leg being arranged to partially extend into its raceway, when said quick motion engaging leg fully projects within its raceway, to disengage the feed-change mechanism and move the disconnectible device to neutral position, when contacted by its ball; and means for actuating a selectively released ball to impart motion to the leg protruding in its raceway.

3. A machine tool as set forth in claim 1 wherein there is an impeller to actuate said power-receiving member when said power-receiving member has been moved to engage the disconnectible device with the quick motion means, an operable control means for causing said impeller to move the power-receiving member in a direction to disengage the disconnectible device from the quick motion means and to move it to neutral position.

4. In a machine tool having a reciprocable tool-slide, a drive means for reciprocating said slide at different slow speeds and at a high speed, a disconnectible device interposed between said slow speed mechanism and said quick motion means for the slide, whereby said drive means may be driven from the slow speed mechanism or the quick motion means or disconnected from both; in combination with a control device having separate selectable means for operating said disconnectible device at one time to disconnect said quick motion means from the slide drive means and to connect the latter with the said slow speed mechanism and to operate said disconnectible device conversely at another time, and further for operating said disconnectible device to move the latter to an ineffectual position from one of its said connected positions; an impeller means for moving said disconnectible device from the other one of its connecting positions to an ineffectual position, said impeller means being conditioned for effective operation, when said disconnectible device is moved to one of its connecting positions, means for maintaining the impeller in conditioned status, and another selectable means on the control device for actuating the impeller maintaining means to allow said impeller to become effective.

5. In a machine tool having a reciprocable tool-slide, a drive means for reciprocating said slide at different slow speeds and at a high speed, a disconnectible device interposed between said slow speed mechanism and said quick motion means for the slide, whereby said drive means may be driven from the slow speed mechanism or the quick motion means or disconnected from both; in combination with a control device having separate selectable means for operating said disconnectible device at one time to disconnect said quick motion means from the slide drive means and to connect the latter with the said slow speed mechanism and to operate said disconnectible device conversely at another time, and further for operating said disconnectible device to move the latter to an ineffectual position from one of its said connected positions; an impeller means for moving said disconnectible device from the other one of its connecting positions to an ineffectual position, said impeller means being conditioned for effective operation, when said disconnectible device is moved to one of its connecting positions, means for maintaining the impeller in conditioned status, and another selectable means on the control device for actuating the impeller maintaining means to allow said impeller to become effective, and means for actuating the other of said selectable means, that moves the disconnectible means to ineffectual position, simultaneously with and from the movement of said selectable means which actuates the impeller maintaining means.

6. A machine tool as set forth in claim 4 wherein there is a pre-set automatically operated means for selectively actuating said selectable means of the control device, and handle-pieces for manually actuating selectively the selectable means of the control device irrespective of the automatically operated pre-set means.

7. In a machine tool having a reciprocable tool-slide, a drive means for the slide for reciprocating said slide at different slow speeds and at a high speed, a clutching means interposed between said feed-change mechanism, quick motion means and said drive means for the slide, whereby said drive means may be driven from the slow motion mechanism or the quick motor means or disconnected from both; a selective control device for operating said clutching means to disconnect said quick motion means from said slide drive means and connect the latter with said slow speed mechanism, and conversely, and to move said clutching means to neutral position; hand-crank means connected to said slide drive means for actuating the latter, a movable cover normally closing said hand-crank means from access; means operable by said cover, when opened, to render ineffective said selective control device that causes the engagement of said slide drive means with the quick motion means or said slow speed mechanism, whereby the clutching device is held in neutral position during hand-cranking, and to render said selective control device effective when said cover is closed.

8. A machine tool as set forth in claim 1 wherein there is an impeller to actuate said power-receiving member when said power-receiving member has been moved to engage the disconnectible device with the quick motion means, an operable control means for causing said impeller to move the power-receiving member in a direction to disengage the disconnectible device from the quick motion means and to move it to neutral position, and means releasably holding said parts to retain said disconnectible device in neutral position.

9. A machine tool as set forth in claim 4 wherein there are means for allaying the effective action of said impeller means and to releasably hold said parts to retain said disconnectible device in ineffective position.

WILLIAM WALLACE POTTER.
ALFRED JOSEPH FULLER.

REFERENCES CITED

The following references are of record in the file of this patent:

UNITED STATES PATENTS

| Number | Name | Date |
|---|---|---|
| 1,881,928 | Potter | Oct. 11, 1932 |
| 2,156,596 | Lloyd | May 2, 1939 |
| 2,224,887 | Van Hamersveld | Dec. 17, 1940 |
| 2,225,886 | Potter | Dec. 24, 1940 |
| 2,255,739 | Curtis | Sept. 9, 1941 |
| 2,302,353 | Smith | Nov. 17, 1942 |
| 2,351,687 | Lange | June 20, 1944 |
| 2,352,183 | Bullard | June 27, 1944 |
| 2,355,623 | Bullard | Aug. 15, 1944 |
| 2,384,809 | Bullard et al. | Sept. 18, 1945 |